US011115497B2

(12) United States Patent
Guim Bernat et al.

(10) Patent No.: US 11,115,497 B2
(45) Date of Patent: Sep. 7, 2021

(54) TECHNOLOGIES FOR PROVIDING ADVANCED RESOURCE MANAGEMENT IN A DISAGGREGATED ENVIRONMENT

(71) Applicant: Intel Corporation, Santa Clara, CA (US)

(72) Inventors: Francesc Guim Bernat, Barcelona (ES); Slawomir Putyrski, Gdynia (PL); Susanne M. Balle, Hudson, NH (US); Thomas Willhalm, Sandhausen (DE); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/829,814

(22) Filed: Mar. 25, 2020

(65) Prior Publication Data
US 2020/0228626 A1    Jul. 16, 2020

(51) Int. Cl.
*H04L 29/08* (2006.01)
*H04L 12/911* (2013.01)

(52) U.S. Cl.
CPC ............ *H04L 67/322* (2013.01); *H04L 47/82* (2013.01); *H04L 67/10* (2013.01)

(58) Field of Classification Search
CPC ....... H04L 67/322; H04L 67/32; H04L 67/10; H04L 67/1002; H04L 67/1004; H04L 67/1008; H04L 67/1012; H04L 67/1031; H04L 47/82
USPC ...................................................... 709/226
See application file for complete search history.

(56) References Cited

U.S. PATENT DOCUMENTS

| | | | | |
|---|---|---|---|---|
| 2005/0060659 | A1* | 3/2005 | Verdun ............... | G06F 3/04847 715/772 |
| 2008/0282030 | A1* | 11/2008 | Kalwitz ................ | G06F 3/0656 711/114 |
| 2011/0153684 | A1* | 6/2011 | Yung ................... | G06F 9/45533 707/805 |
| 2014/0006076 | A1* | 1/2014 | Cash, Jr. .......... | G06Q 10/06311 705/7.14 |
| 2018/0024861 | A1* | 1/2018 | Balle .................. | G06F 13/4068 718/104 |
| 2018/0150299 | A1* | 5/2018 | Balle .................... | G06F 13/1652 |
| 2018/0227240 | A1* | 8/2018 | Liu ..................... | H04L 67/1029 |
| 2018/0276038 | A1* | 9/2018 | Malik ................. | G06F 9/45558 |
| 2019/0042091 | A1* | 2/2019 | Raghunath ............ | G06F 12/06 |
| 2019/0235449 | A1* | 8/2019 | Slessman .............. | G06F 9/5094 |

(Continued)

OTHER PUBLICATIONS

International Search Repon and Written Opinion for PCT Patent Application No. PCT/US20/64605, dated Mar. 26, 2021, 11 pages.

*Primary Examiner* — Ruolei Zong
(74) *Attorney, Agent, or Firm* — Compass IP Law PC

(57) ABSTRACT

Technologies for providing advanced resource management in a disaggregated environment include a compute device. The compute device includes circuitry to obtain a workload to be executed by a set of resources in a disaggregated system, query a sled in the disaggregated system to identify an estimated time to complete execution of a portion of the workload to be accelerated using a kernel, and assign, in response to a determination that the estimated time to complete execution of the portion of the workload satisfies a target quality of service associated with the workload, the portion of the workload to the sled for acceleration.

20 Claims, 22 Drawing Sheets

(56) References Cited

U.S. PATENT DOCUMENTS

2019/0319956 A1\* 10/2019 Yang ................. H04W 12/0806
2020/0026571 A1\* 1/2020 Bahramshahry .... G06F 11/2023

\* cited by examiner

TECHNOLOGIES FOR PROVIDING ADVANCED RESOURCE MANAGEMENT IN A DISAGGREGATED ENVIRONMENT

BACKGROUND

In some data centers in which operations are performed on behalf of customers (e.g., tenants), resources are organized in a disaggregated architecture in which sets of resources (e.g., compute devices, accelerator devices, data storage devices, etc.) are physically separate from each other (e.g., a compute device may be in a separate circuit board than an accelerator device). In operation, a central compute device may discover available resources in the system and allocate (e.g., "compose") them into a group to cooperatively execute a workload (e.g., a set of operations, such as an application executed on behalf of a tenant). In some systems, the central compute device is tasked with receiving data from each resource, indicating the present operating conditions of each resource in the data center. In response, the central compute device continually adjusts the operations of the resources to ensure that a set of quality of service (QoS) targets (e.g., latency, throughput, etc.) are satisfied in the execution of workloads. The amount of data being sent to the central compute device may present a significant burden on the central compute device and the network paths extending between the resources and the central compute device. However, decreasing the amount of data communicated to the central compute device, while alleviating a portion of the load on the central compute device, may cause conditions (e.g., thermal conditions) on one or more of the resources to fall outside of a desired range and negatively affect the QoS provided by the disaggregated resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
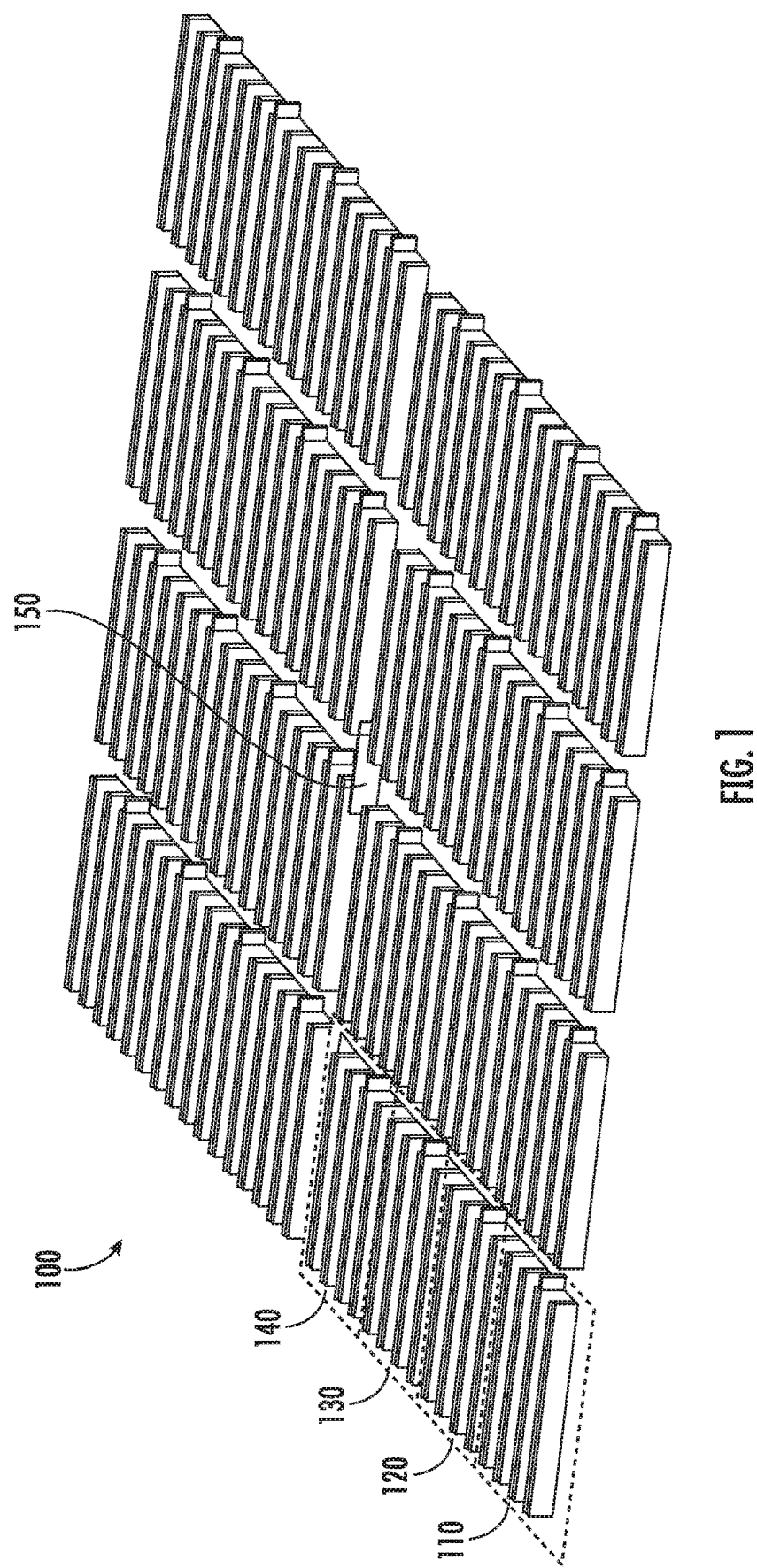
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of tenants) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
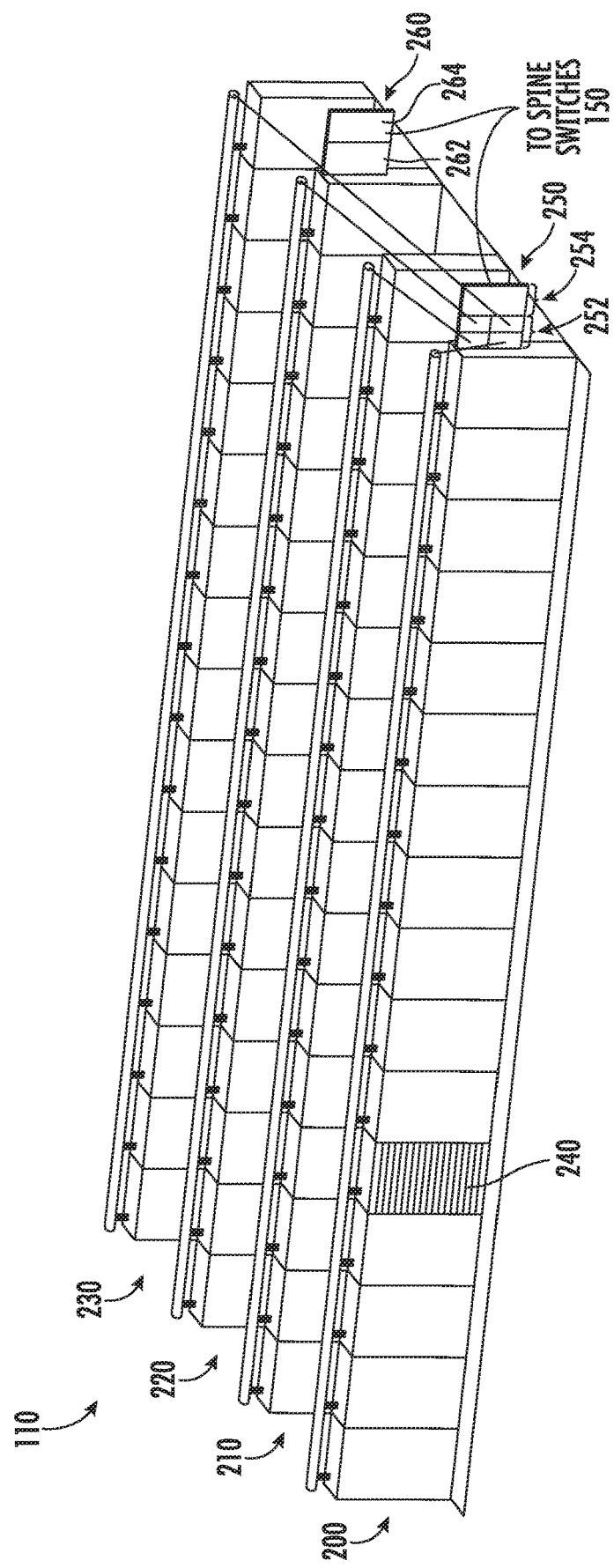
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
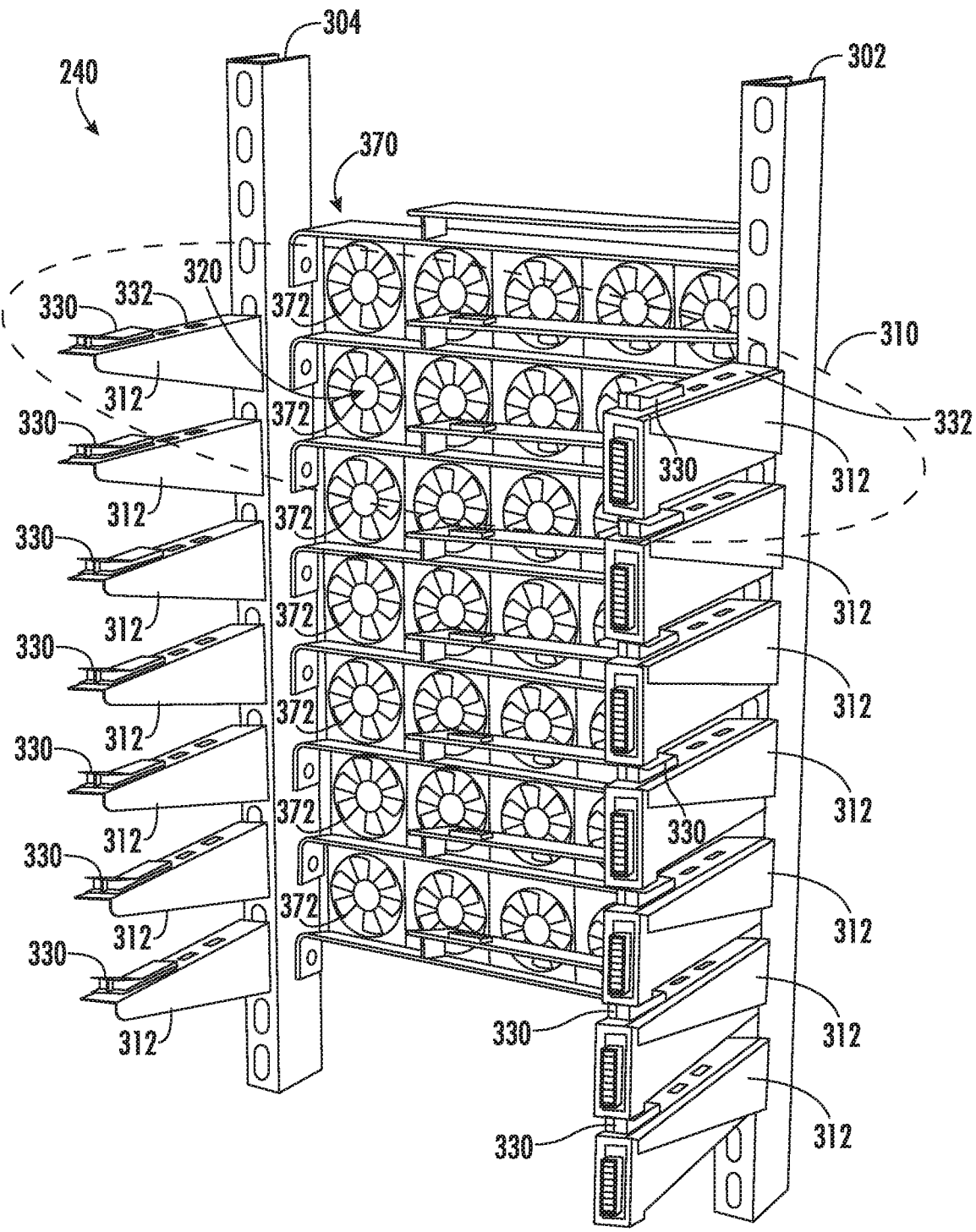
FIG. 3 is a perspective view of at least one embodiment of a rack that may be included in the pod of FIG. 2.
Figure 4:
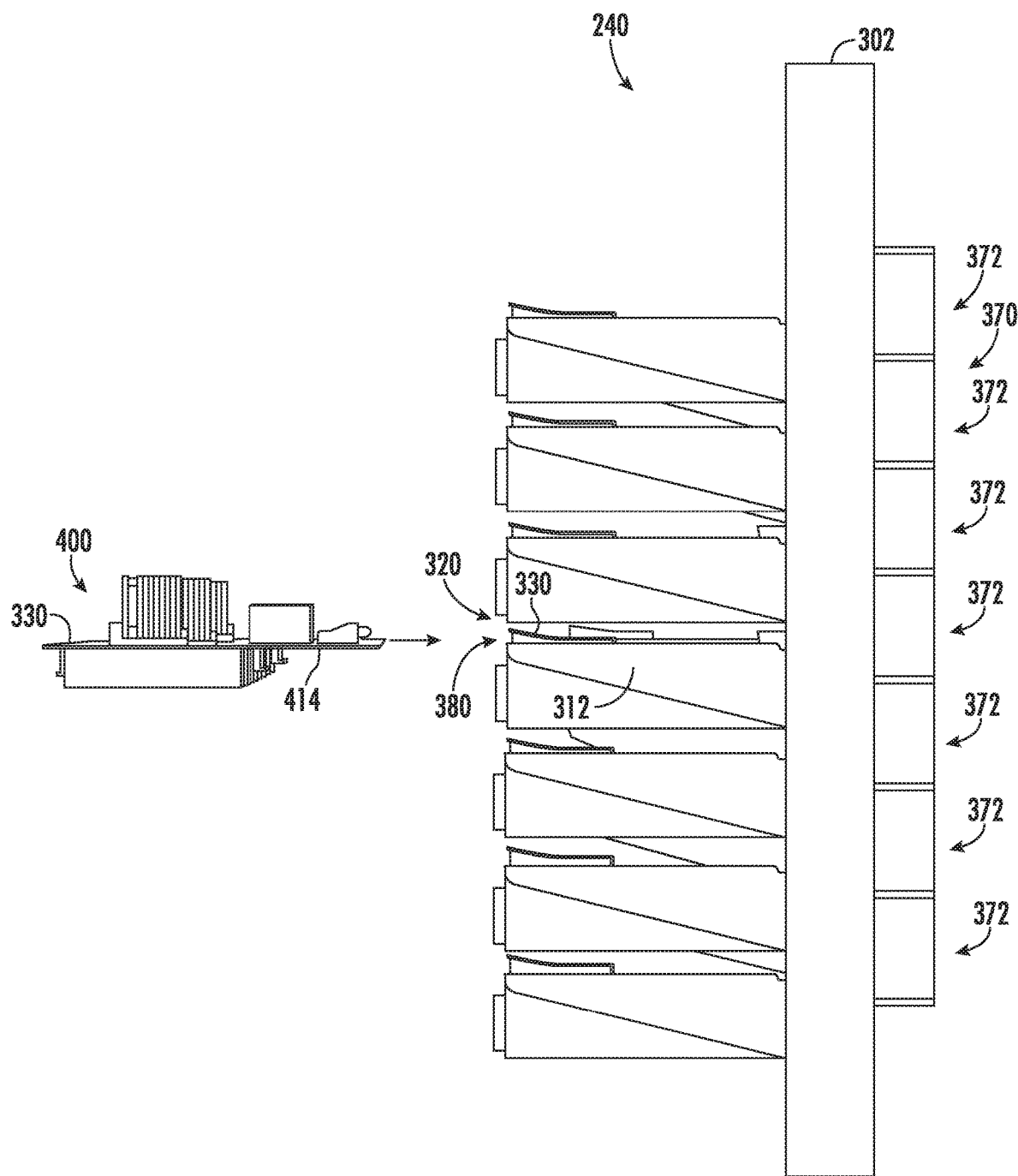
FIG. 4 is a side elevation view of the rack of FIG. 3.
Figure 5:
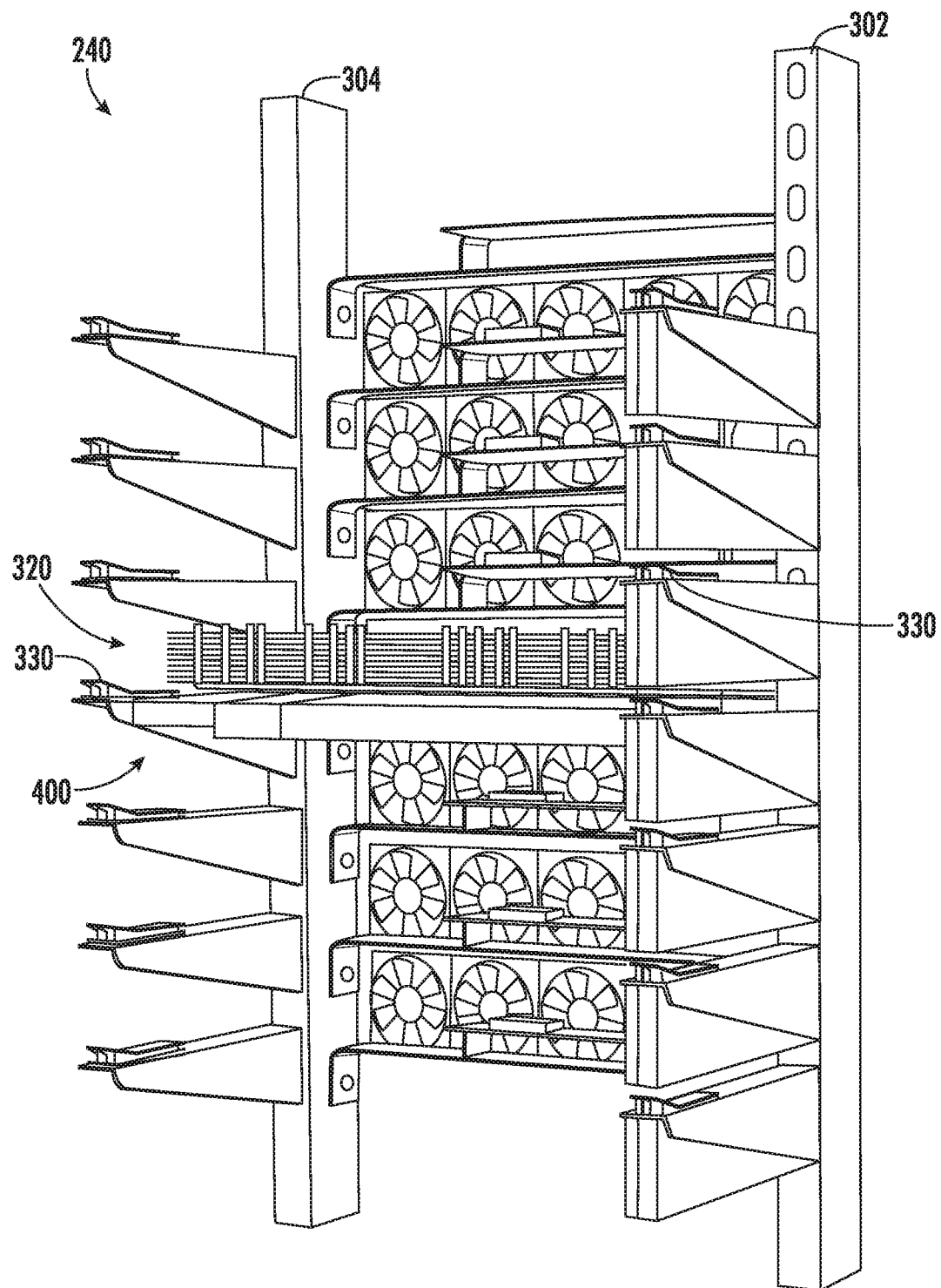
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
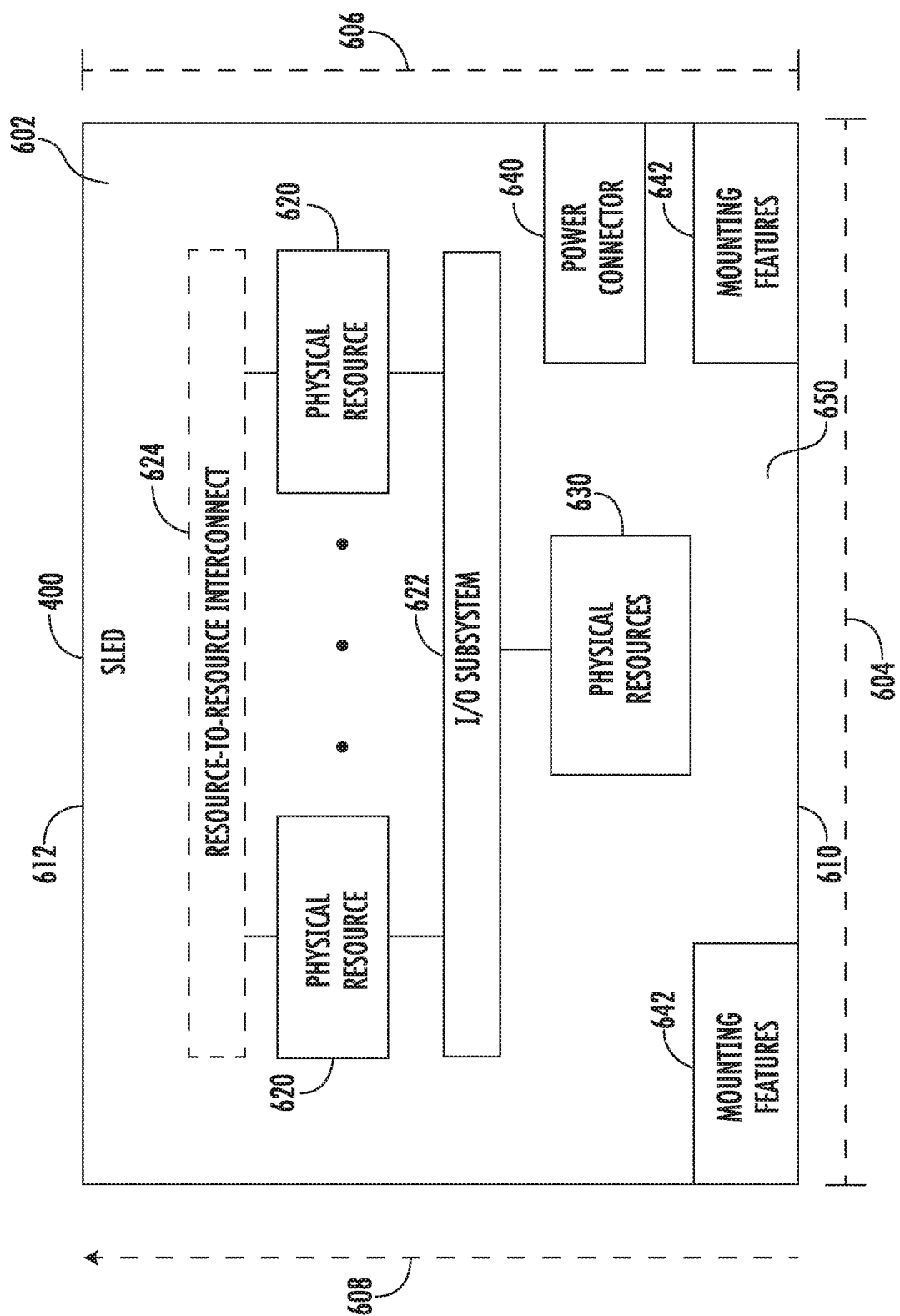
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus, as described further below.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
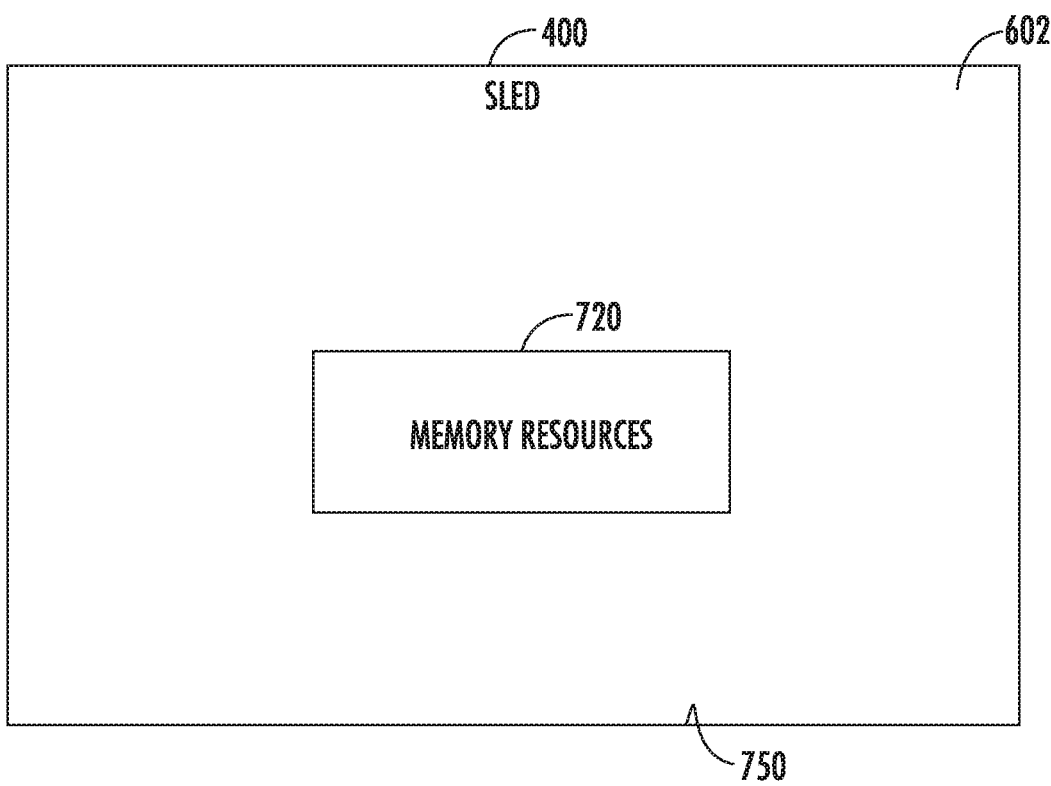
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a memory that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by the Joint Electronic Device Engineering Council (JEDEC), such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the memory devices that implement such standards may be referred to as DDR-based interfaces.

In one embodiment, the memory device is a block addressable memory device, such as those based on NAND or NOR technologies, such as multi-threshold level NAND flash memory or NOR flash memory. A memory device may also include byte-addressable write-in-place nonvolatile memory devices, such as Intel 3D XPoint™ memory, Micron QuantX™ memory, magnetoresistive random access memory (MRAM) memory that incorporates memristor technology, or other byte addressable write-in-place non-volatile memory devices. In some embodiments, the memory device may comprise a transistor-less stackable cross point architecture in which memory cells sit at the intersection of word lines and bit lines and are individually addressable and in which bit storage is based on a change in bulk resistance. In one embodiment, the memory device may be or may include memory devices that use chalcogenide glass, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Figure 8:
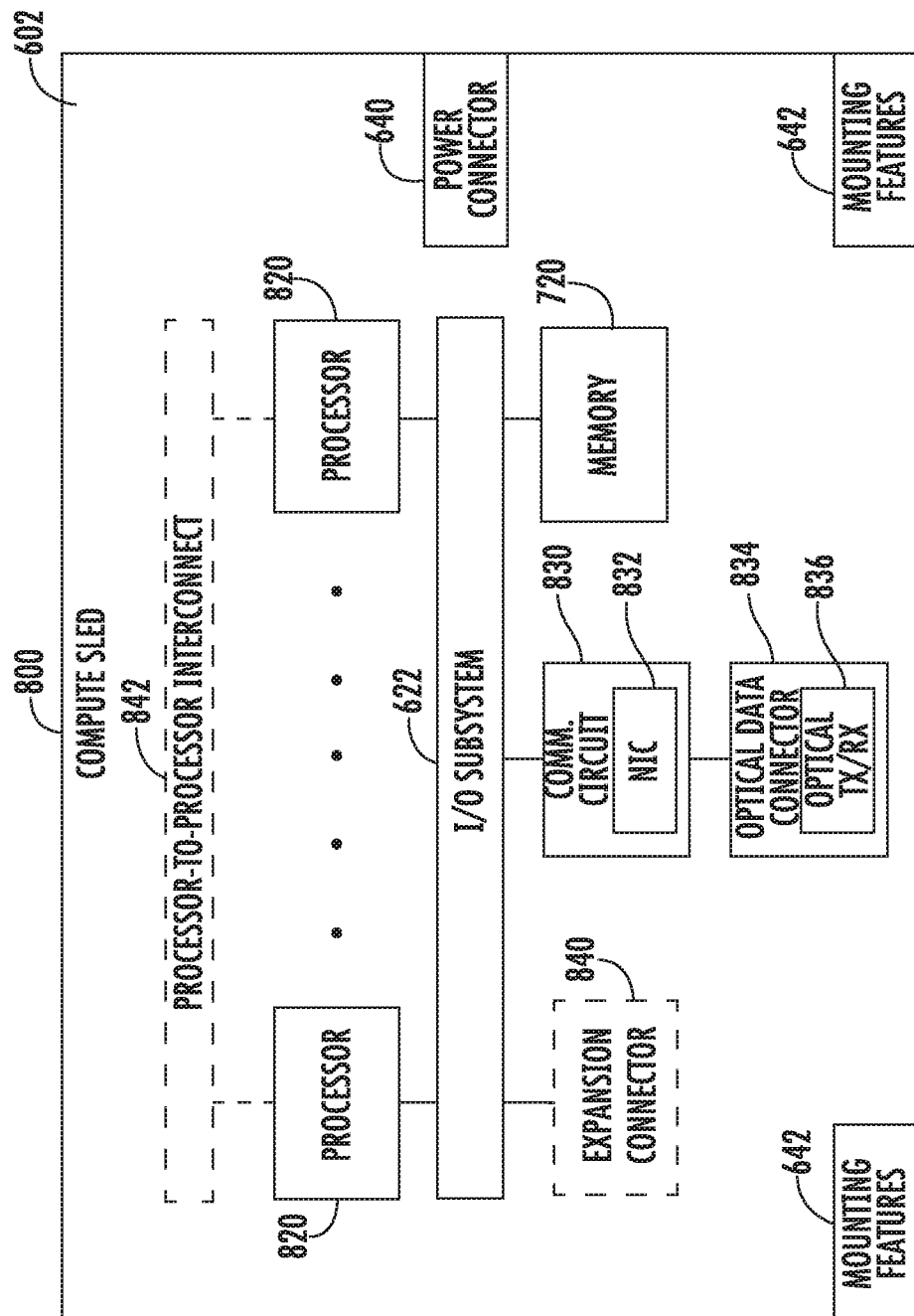
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
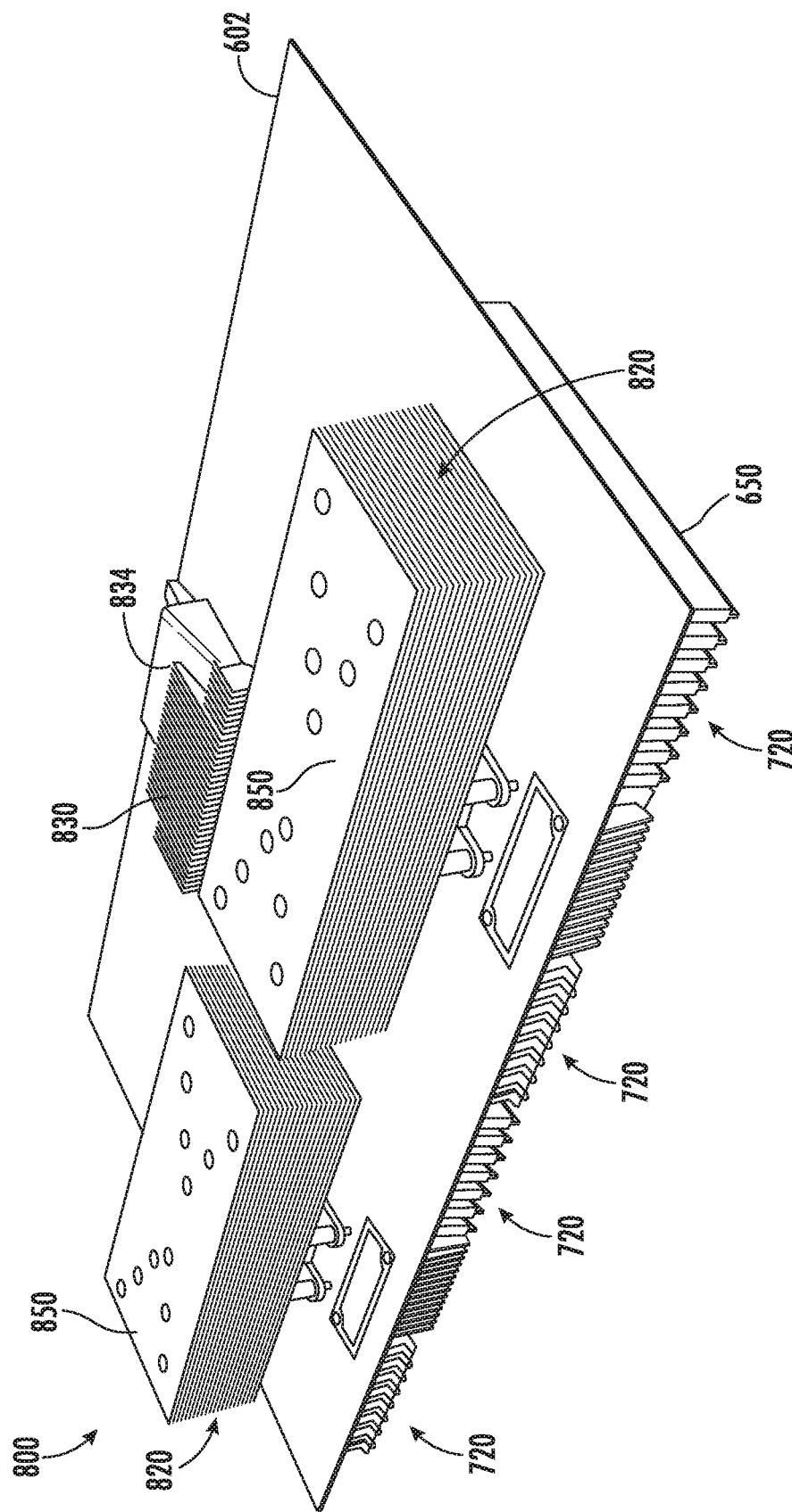
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heat sink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heat sinks 850 having a larger size relative to traditional heat sinks used in typical servers. Additionally, due to the improved thermal cooling characteristics of the chassis-less circuit board substrate 602, none of the processor heat sinks 850 include cooling fans attached thereto. That is, each of the heat sinks 850 is embodied as a fan-less heat sink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
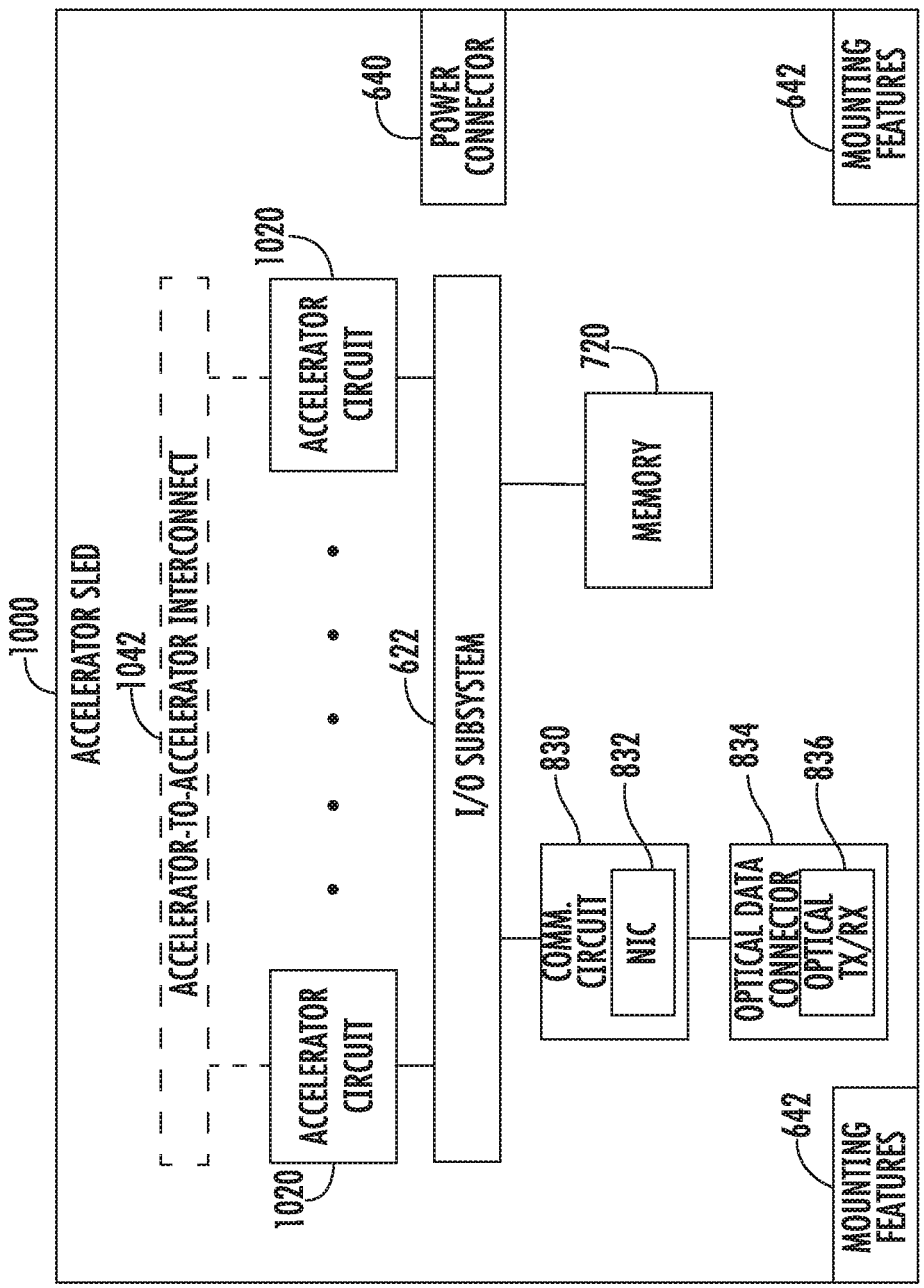
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
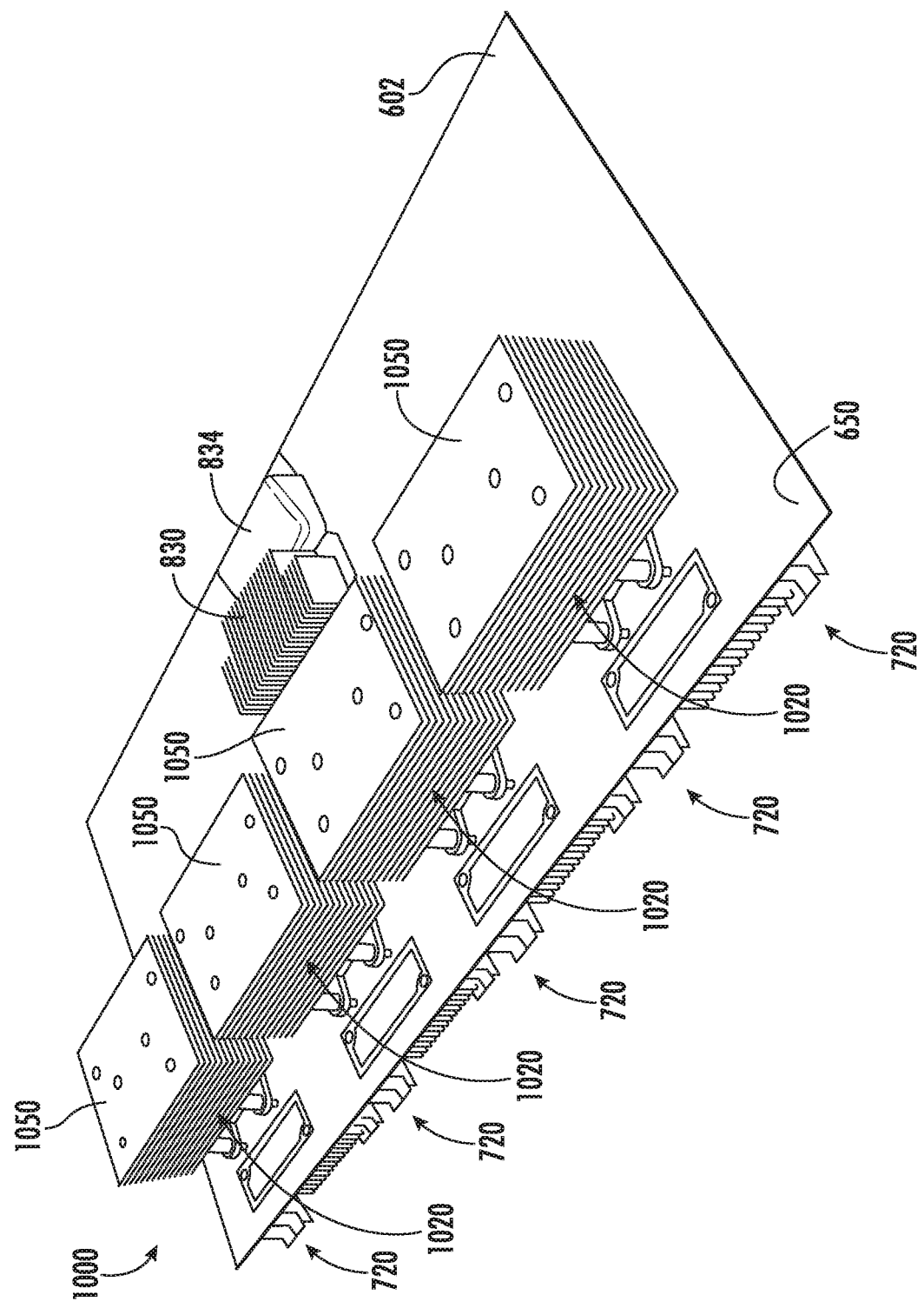
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), a Compute Express Link (CXL), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heat sink 1070 that is larger than a traditional heat sink used in a server. As discussed above with reference to the heat sinks 870, the heat sinks 1070 may be larger than traditional heat sinks because of the "free" area provided by the memory resources 720 being located on the bottom side 750 of the chassis-less circuit board substrate 602 rather than on the top side 650.

Figure 12:
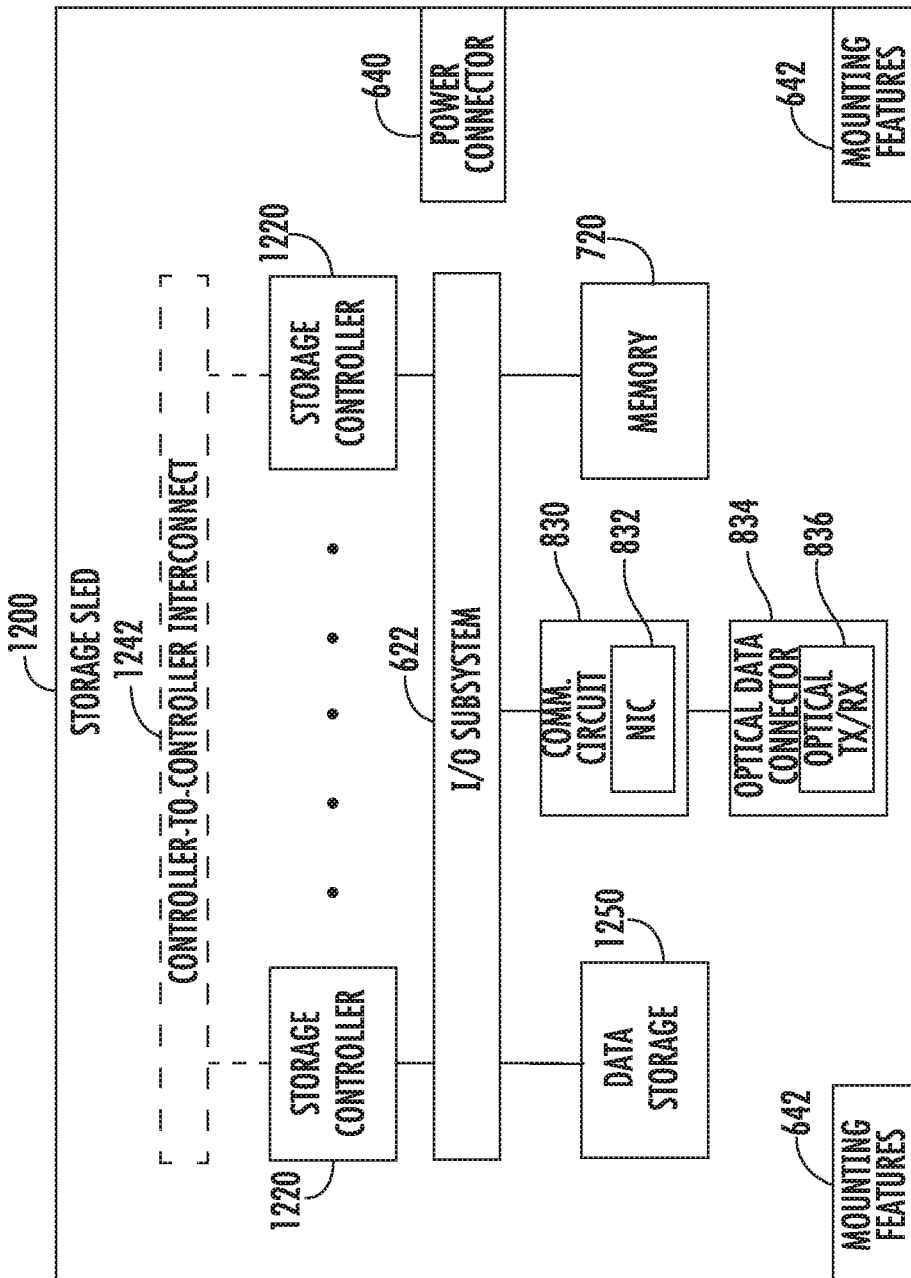
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
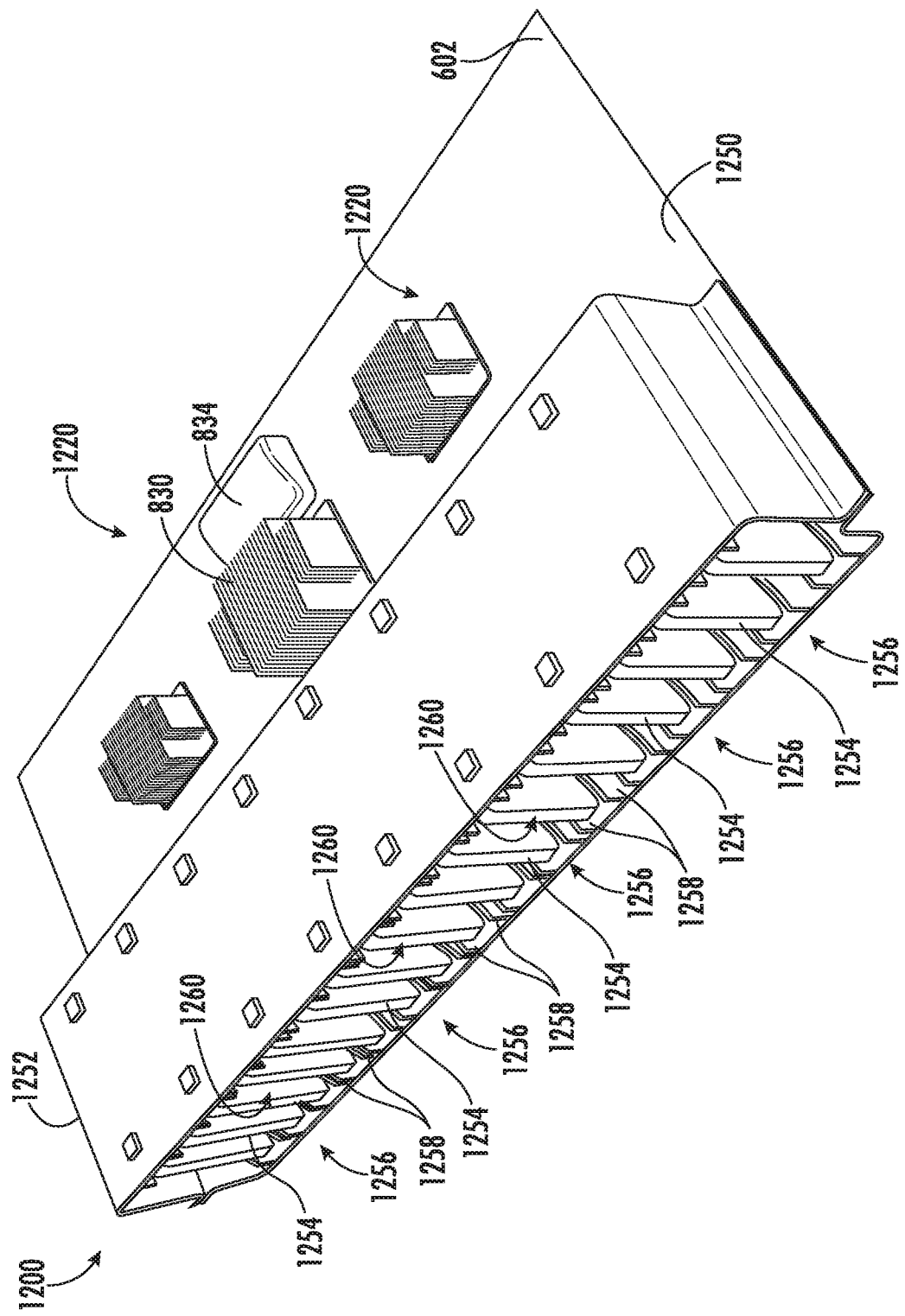
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heat sink 1270 secured thereto. As discussed above, due to the improved thermal cooling characteristics of the chassis-less circuit board substrate 602 of the storage sled 1200, none of the heat sinks 1270 include cooling fans attached thereto. That is, each of the heat sinks 1270 is embodied as a fan-less heat sink.

Figure 14:
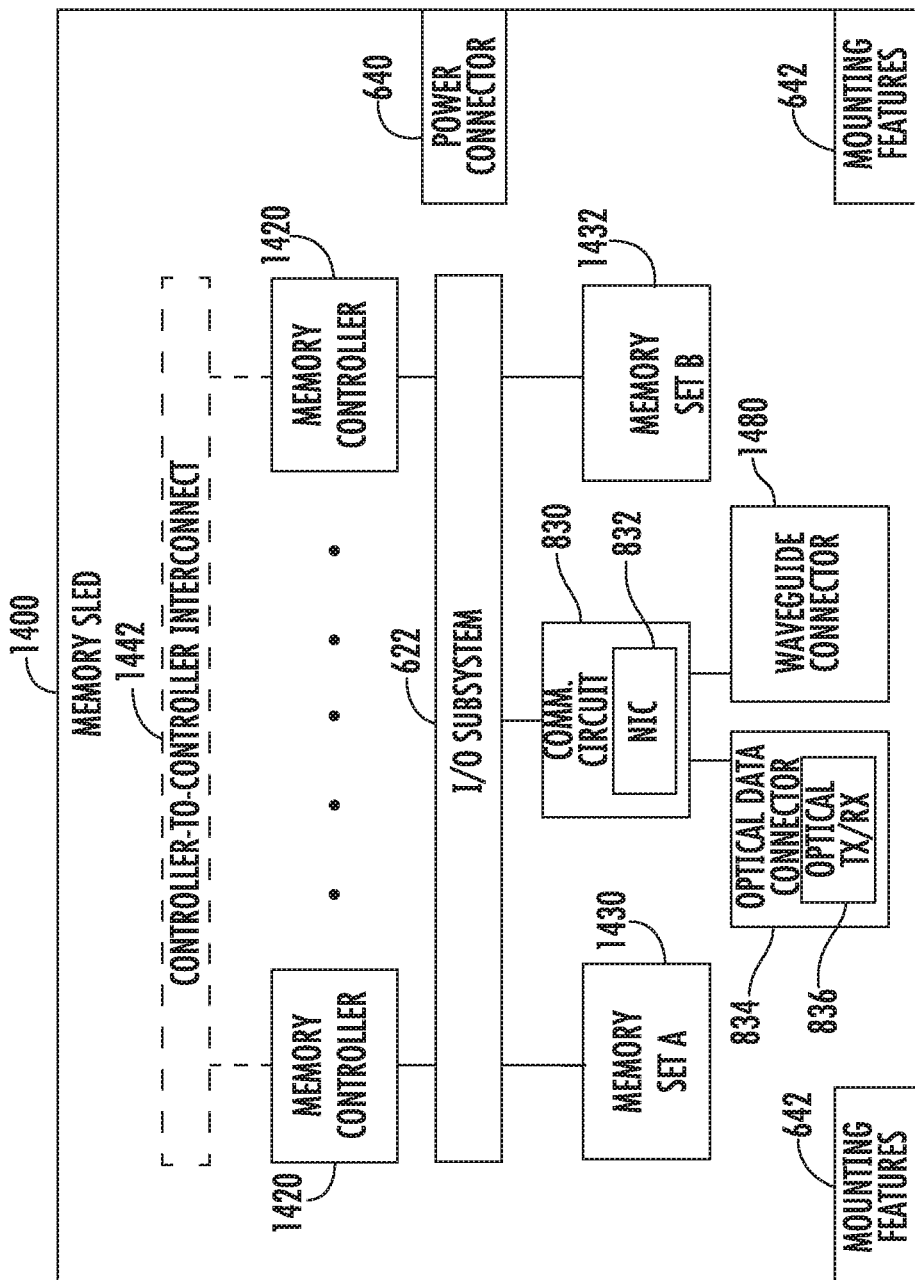
FIG. 14 is a simplified block diagram of at least one embodiment of a memory sled usable in the data center of FIG. 1.

Referring now to FIG. 14, in some embodiments, the sled 400 may be embodied as a memory sled 1400. The memory sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1400. For example, during operation, a compute sled 800 or an accelerator sled 1000 may remotely write to and/or read from one or more of the memory sets 1430, 1432 of the memory sled 1400 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
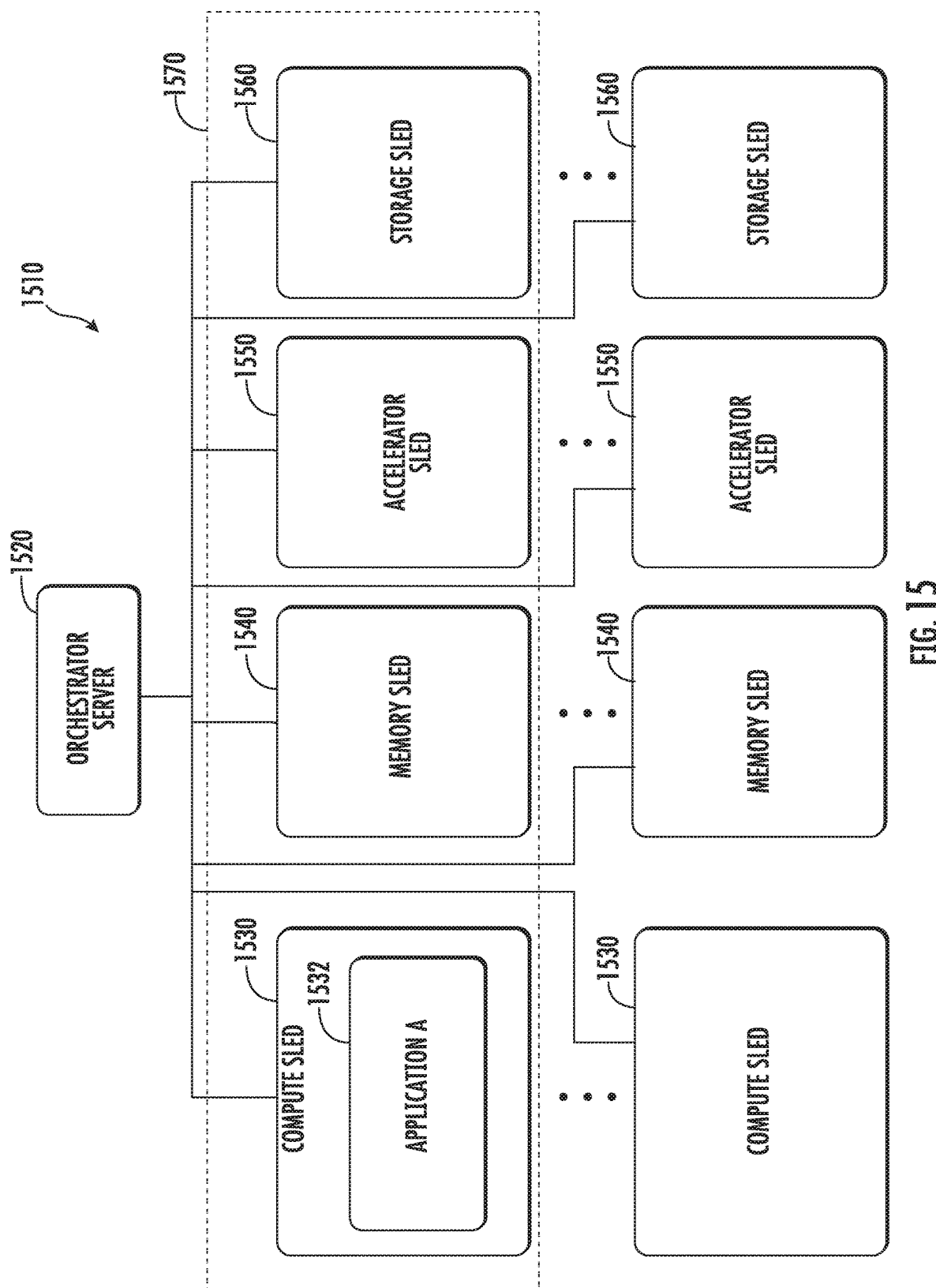
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the accelerator sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers (e.g., tenants) the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
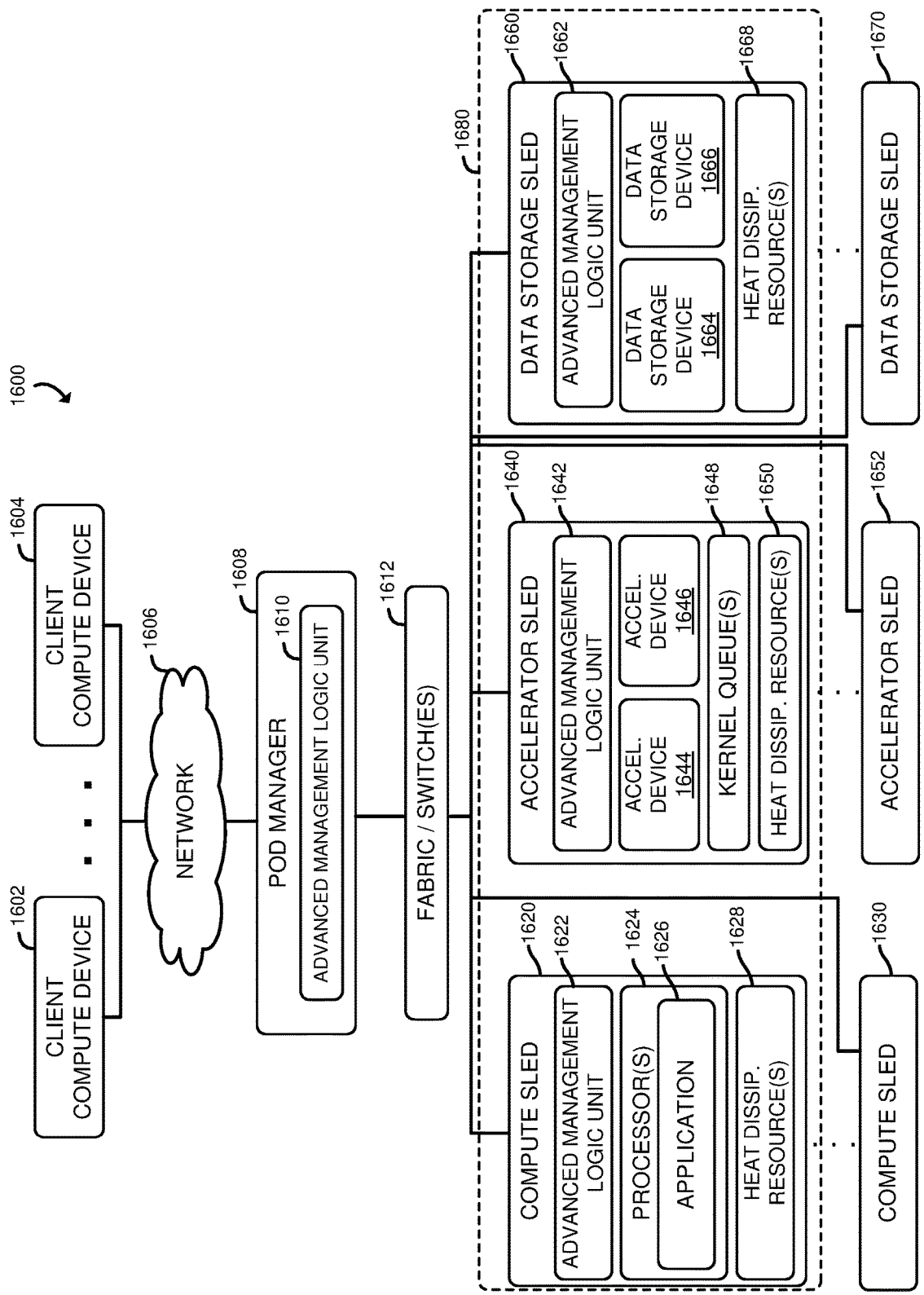
FIG. 16 is a simplified block diagram of at least one embodiment of a system for providing advanced resource management in the data center of FIG. 1.

Referring now to FIG. 16, a disaggregated system 1600 for providing advanced resource management (e.g., resource selection, orchestration, and management schemes) includes a pod manager 1608, which may be embodied as any compute device (e.g., a compute sled) capable of managing the operations of multiple sleds across the system 1600 (e.g., across multiple racks) and configuring the allocation (e.g., selection) of resources (e.g., processors, accelerator devices, data storage devices, etc.) to composed nodes (e.g., managed nodes) to execute workloads (e.g., sets of operations, processes, applications, etc.) in satisfaction of a defined set of quality of service (QoS) targets. The QoS targets may be defined by a service level agreement (SLA) between an owner/operator of the system 1600 (e.g., data center owner) and customers (e.g., tenants) of the system 1600. The workloads may be performed in response to requests from corresponding client compute devices 1602, 1604 through a network 1606, which may be embodied as any type of wired or wireless communication network, including global networks (e.g., the Internet), local area networks (LANs) or wide area networks (WANs), cellular networks (e.g., 5G, 4G, 3G, Global System for Mobile Communications (GSM), Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof. In some embodiments, at least some of the components of the system 1600 may be located at one or more edge locations (e.g., small cells, base stations, etc.) of a network.

The pod manager 1608, in the illustrative embodiment, is connected to multiple sleds 1620, 1630, 1640, 1652, 1660, 1670 through a fabric (e.g., one or more switches or other networking components) 1612. In the illustrative embodiment, the sleds 1620, 1630 are compute sleds, similar to the compute sled 800 and include among other components, processors 1624 (e.g., similar to the processors 820) to execute one or more applications 1626 (e.g., sets of instructions, processes, etc. defining a workload). The sleds 1640, 1652, in the illustrative embodiment, are accelerator sleds, similar to the accelerator sled 1000 and include accelerator devices 1644, 1646, similar to the accelerator circuits 1020. The sleds 1660, 1670, in the illustrative embodiment, are data storage sleds, similar to the storage sled 1200, and include data storage devices 1664, 1666 similar to the data storage devices similar to the data storage 1250. While not shown in FIG. 16, the system 1600 may also include sleds of other types (e.g., memory sleds) connected to the pod manager 1608.

As shown in FIG. 16, the pod manager 1608 and the sleds 1620, 1630, 1640, 1652, 1660, 1670 include advanced management logic units 1610, 1622, 1642, 1662. Each advanced management logic unit 1610, 1622, 1642, 1662 may be embodied as any device or circuitry (e.g., a processor, a co-processor, application specific circuitry (ASIC), reconfigurable circuitry (e.g., a field programmable gate array (FPGA)), etc.) or software configured to enable a compute sled (e.g., the compute sled 1620) to define a tenant partition 1680 that includes a set of disaggregated resources (e.g., devices usable to execute workloads, such as the processor(s) 1624, the accelerator devices 1644, 1646, data storage devices 1664, 1666, and/or other devices) and offload management of the selection and operation of the resources from the pod manager 1608 (e.g., giving a tenant fine grained control over the resources allocated to execute a workload). With respect to at least some of the sleds (e.g., the accelerator sleds 1640, 1652), the advanced management logic units implement a system in which sleds may be queried for their ability to complete a requested task (e.g., execute a kernel on one or more accelerator devices) and respond with an estimated time to completion of the requested task. In doing so, the accelerator sleds 1640, 1652 may utilize queues of kernels (e.g., kernel queues 1648), which may be local to each accelerator device 1644, 1646 or shared (e.g., global across multiple accelerator devices) and may be divided into queues associated with different levels of priority to manage the execution of acceleration tasks (e.g., workloads) and estimate the time to completion for any given task.

Moreover, the advanced management logic units 1610, 1622, 1642, 1662 enable thermal management operations to be executed locally on each sled 1620, 1630, 1640, 1652, 1660, 1668 using information about the sensitivity of a workload to the performance of the corresponding resources on the sled, the capabilities of the resources on the sled to operate at different power levels and temperatures, the performance provided by each resource under different power levels and temperatures, the cooling capabilities of heat dissipation resources (e.g., fans, pumps, etc.) 1628, 1650, 1668 on the sleds, and the monetary costs of operating under different power levels. The advanced management logic units are also configured to request assistance from an external compute device when the QoS target(s) or service level agreement (SLA) of a particular workload cannot be satisfied under the present conditions and parameters available to the thermal management system on the corresponding sled 1620, 1630, 1640, 1652, 1660, 1670. Further, the advanced management logic units 1610, 1622, 1642, 1662 may enable the system 1600 to detect patterns in data access requests associated with clients (e.g., the client compute devices 1602, 1604), determine whether the patterns are indicative of random data accesses or sequential data accesses, and redirect the requests to corresponding data storage devices 1664, 1666 that are configured to handle requests associated with the corresponding data access pattern (e.g., a set of data storage devices configured to handle sequential data accesses, another set of data storage devices configured to handle random data storage accesses), etc. Further, and as described in more detail herein, the advanced management logic units 1610, 1622, 1642, 1662 may implement a scheme in which data access requests (e.g., sequential data access requests) are grouped into batches before being sent to the corresponding data storage devices, to increase the efficiency with which the data storage devices are used (e.g., reducing the overall amount of network traffic for a given set of data access requests, reducing the total latency for accessing a sequential set of data, etc.). In some embodiments, based on the service priority (e.g., which correlates with an amount of money a tenant is paying under a service level agreement), the system 1600 may adjust the prioritization of a stream to selectively increase or decrease the serialization of a pattern of requests that are being serviced (e.g., to increase or reduce randomness). Requests associated with workloads that have relatively high priority may be executed regardless of the fact that they may interfere with other serial streams, thereby making the overall pattern of requests received by the data storage devices random.

Figure 17:
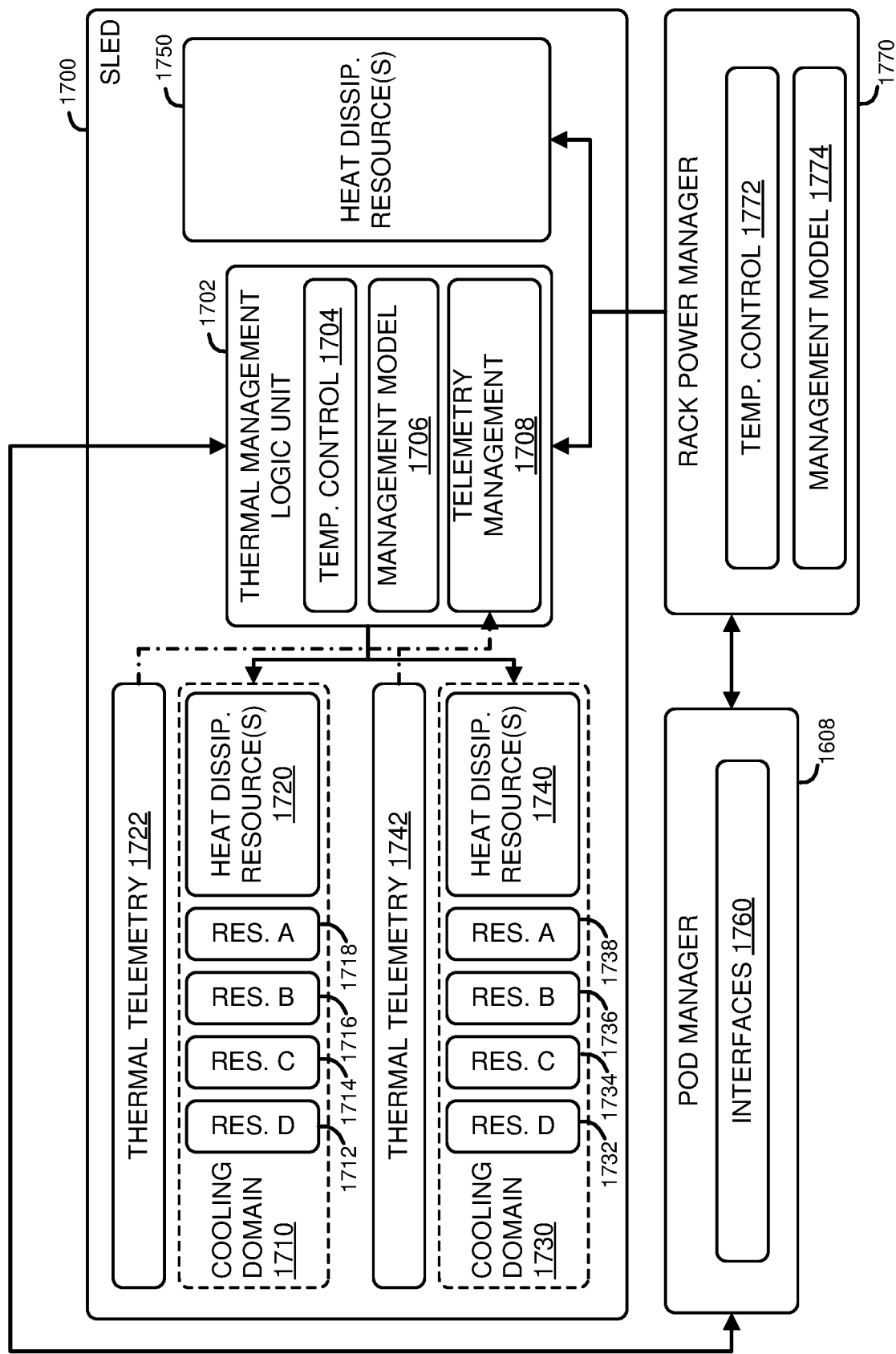
FIG. 17 is a simplified block diagram of at least one embodiment of a thermal management system that may be implemented using one or more of the sleds in the system of FIG. 16.

Referring now to FIG. 17, each sled 1700 (representative of the sleds 1620, 1630, 1640, 1652, 1660, 1668) may include a thermal management logic unit 1702 which may be embodied as any device or circuitry (e.g., a processor, an ASIC, an FPGA, etc.) configured to monitor thermal conditions in each of one or more cooling domains 1710, 1730 on the sled 1700 and adjust the power consumed and heat produced by one or more resources 1712, 1714 1716, 1718, 1732, 1734, 1736, 1738 (e.g., processors, accelerator devices, data storage devices, and other devices usable to execute workloads) and/or adjust the performance level (e.g., fan speed, liquid pumping speed, etc.) of one or more heat dissipation resources 1720, 1740, 1750 (e.g., fans, liquid coolant pumps, etc.) to balance thermal capabilities of the resources, the performance (e.g., throughput, latency, operations per second, etc.) provided by the resources at different temperatures, and the heat dissipation capabilities of the heat dissipation resources 1720, 1740, 1750 with the QoS targets of the assigned workload(s) (e.g., monetary cost, latency, throughput, operations per second, etc.). As will be appreciated by those skilled in the art, a higher operating temperature corresponds with a higher power usage and energy consumption per unit of work for the resources in the disaggregated system 1600. In the illustrative embodiment, the thermal management logic unit 1702 includes a temperature control logic unit 1704, a management model logic unit 1706, and a telemetry management logic unit 1708. The temperature control logic unit 1704 may be any device or circuitry (e.g., processor, ASIC, FPGA, etc.) configured to issue instructions to one or more of the resources 1712, 1714, 1716, 1718, 1732, 1734, 1736, 1738 to adjust (e.g., increase or decrease) their power consumption (e.g., to increase the speed of execution of a workload and to adjust their heat production accordingly) and/or adjust a performance level (e.g., fan speed, pumping speed, etc.) of one or more of the heat dissipation resources 1720, 1740, 1750 to satisfy a target temperature.

The temperature control logic unit 1704 may determine the instructions to send to the resources 1712, 1714, 1716, 1718, 1732, 1734, 1736, 1738 and to the heat dissipation resources 1720, 1740, 1750 by communicating with the management model logic unit 1706, which may be embodied as any device or circuitry (e.g., a processor, ASIC, FPGA, etc.) configured to associate power consumption set points of the resources 1712, 1714, 1716, 1718, 1732, 1734, 1736, 1738 with their performance (e.g., throughput, operations per second, latency, etc.) and performance levels of the heat dissipation resources 1720, 1740, 1750, (e.g., performance levels to dissipate different amounts of heat) and the QoS targets (e.g., to determine a needed set point of one or more of the resources 1712, 1714, 1716, 1718, 1732, 1734, 1736, 1738 and corresponding performance levels of the heat dissipation resources 1720, 1740, 1750 to satisfy one or more QoS targets). The telemetry management logic unit 1708 may be embodied as any device or circuitry (e.g., processor, ASIC, FPGA, etc.) configured to receive telemetry data (e.g., thermal telemetry 1722, 1742) from the resources and provide the telemetry data to the management model logic unit 1706. The telemetry data may be embodied as any data indicative of the present thermal conditions (e.g., temperature) of the resources, the power consumption set point of each resource, and the present performance level of each heat dissipation resource 1720, 1740, 1750. The telemetry management logic unit 1708 may also send all or a portion of the telemetry data to an external device, such as a rack power manager 1770, which may be embodied as any device or circuity (e.g., a microcontroller, a processor, an ASIC, an FPGA, etc.) that is in communication with or integrated into the pod manager 1608 and communicates with the pod manager 1608 through one or more interfaces 1760 (e.g., any device or circuitry configured to enable communication) and configured to operate in a manner similar to the thermal management logic unit 1702 on a rack level (e.g., for multiple sleds in a rack) rather than on an individual sled level. As such, the rack power manager 1770, in the illustrative embodiment, includes a temperature control logic unit 1772, similar to the temperature control logic unit 1704, and a management model logic unit 1774, similar to the management model logic unit 1774.

Given that the rack power manager 1770 operates on a rack level, the rack power manager 1770 may adjust operations of one sled to improve the thermal conditions on another sled (e.g., reducing heat production on one sled to lower the ambient temperature on a nearby sled) and may coordinate offloading of operations from one sled to another sled, if one sled is unable to satisfy a given QoS target with the resources 1712, 1714, 1716, 1718, 1732, 1734, 1736, 1738 and heat dissipation resources 1720, 1740, 1750 of that sled. In some embodiments, the operations of the pod manager 1608 may be performed by a compute sled 1620 (e.g., the compute sled 1620), such as when a tenant partition (e.g., the tenant partition 1680) has been established to enable the compute sled 1620 to control the operations of the resources within the tenant partition.

Figure 18:
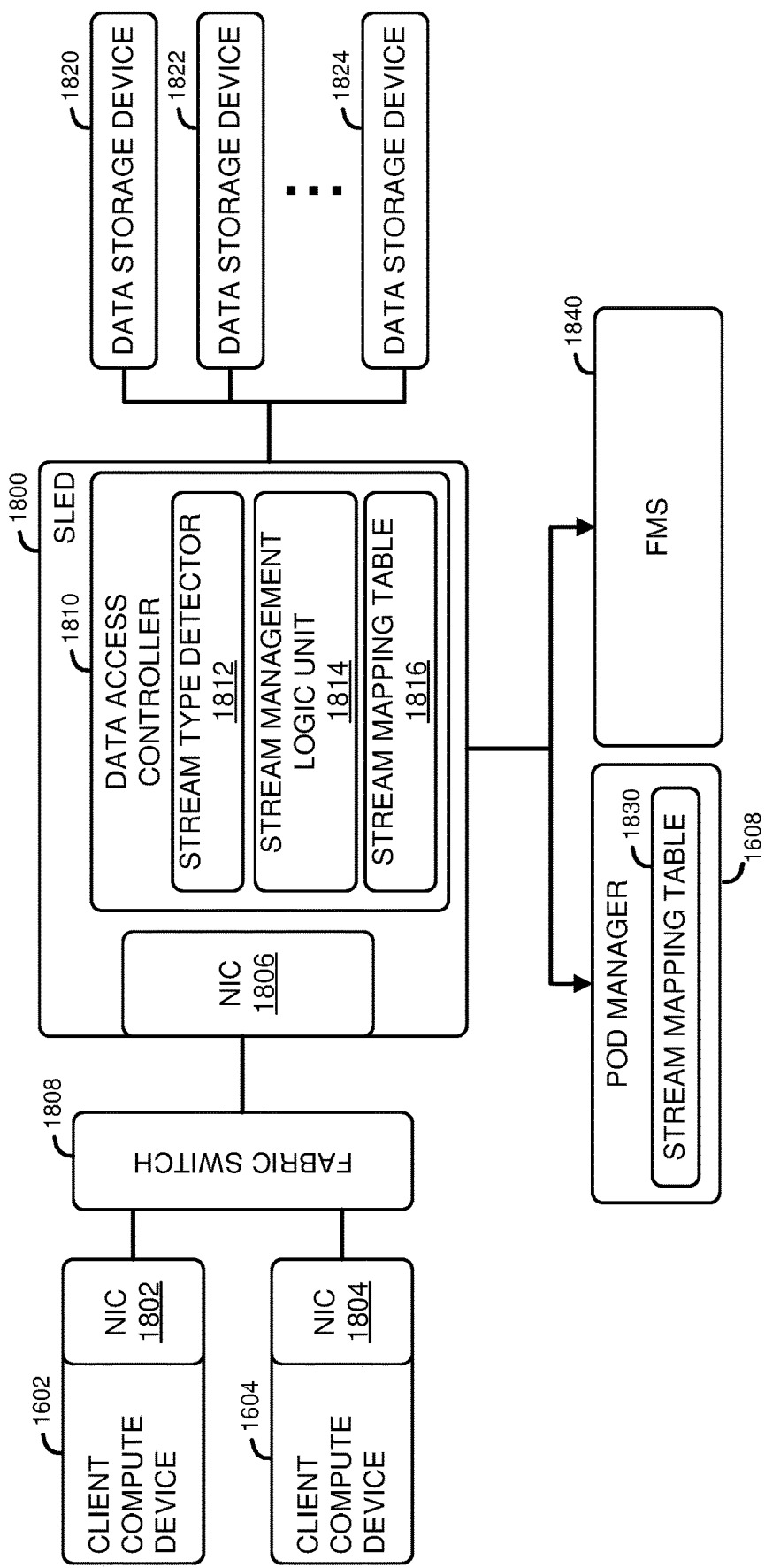
FIG. 18 is a simplified block diagram of at least one embodiment of a data storage resource selection system that may be implemented in the system of FIG. 16.

Referring now to FIG. 18 a sled 1800, such as the sled 1620 or the sled 1660, may include a data access controller 1810 which may be embodied as any device or circuitry (e.g., processor, ASIC, FPGA, etc.) configured to receive data access requests from the client compute devices 1602, 1604 (e.g., via the network interface controllers 1802, 1804, 1806, which are in communication through the fabric switch 1808). The data access requests may fall into a pattern, such as sequential data accesses (e.g., in a content delivery network (CDN) workload, in which contiguous parts of a movie, music, or other content are read sequentially from one or more data storage devices 1820, 1822, 1824) or random data accesses (e.g., in an e-commerce workload in which different sections of a database are accessed). Some of the data storage devices 1820 may have longer seek times than others, while providing higher sustained throughput for contiguous (e.g., sequential) data accesses while other data storage devices 1822, 1824 may have an architecture that provides faster seek times, but lower sustained throughput for contiguous data accesses. As such, the data access controller 1810, in the illustrative embodiment, analyzes streams of data access requests associated with the client compute devices 1602, 1604, determines the type of data access pattern (e.g., random or sequential) that the requests from each client compute device 1602, 1604 exhibit, and maps the streams to corresponding data storage devices 1820, 1822, 1824 suited for those patterns. To do so, in the illustrative embodiment, the data access controller 1810 includes a stream type detector logic unit 1812, a stream management logic unit 1814, and a stream mapping table logic unit 1816.

The stream type detector logic unit 1812 may be embodied as any device or circuitry (e.g., processor, ASIC, FPGA, etc.) configured to analyze the data access streams from the client compute devices 1602, 1604 and determine which type of pattern (e.g., sequential or random) the stream exhibits (e.g., such as by comparing addresses in the data access requests to determine whether they represent contiguous/sequential addresses over time or not). The stream management logic unit 1814 may be embodied as any device or circuitry (e.g., processor, ASIC, FPGA, etc.) configured to route incoming data access requests to the corresponding data storage devices 1820, 1822, 1824 based on the determined type of pattern that the requests are associated with and the data storage device(s) 1820, 1822, 1824 best suited to the determined pattern. The stream mapping table logic unit 1816 may be embodied as any device or circuitry (e.g., processor, ASIC, FPGA, etc.) configured to maintain (e.g., create and update) a map of access streams (e.g., identifiers of client compute devices 1602, 1604 from which the requests originate, session identifiers, etc.) to corresponding data storage devices 1820, 1822, 1824 suited to the patterns of those data access streams. In some embodiments, the data access controller 1810 may also coordinate replicating data across data storage devices (e.g., from a data storage device 1820 suited to sequential data accesses to a data storage device 1822 suited to random data accesses). The sled 1800 may be in communication with the pod manager 1608 and a function management service (e.g., an orchestrator server) 1840 and provide hint data indicative of the mapping of data access streams to the data storage devices 1820, 1822, 1824 (e.g., to keep the pod manager 1608 apprised of the mappings). As such, the pod manager 1608 may include a stream mapping table logic unit 1830, which may be similar to the stream mapping table logic unit 1816 and may maintain a data set that mirrors the mappings maintained by the stream mapping table 1816 or may maintain a superset (e.g., including mappings determined by stream mapping table logic units of other sleds) or a subset of the mappings.

Figure 19:
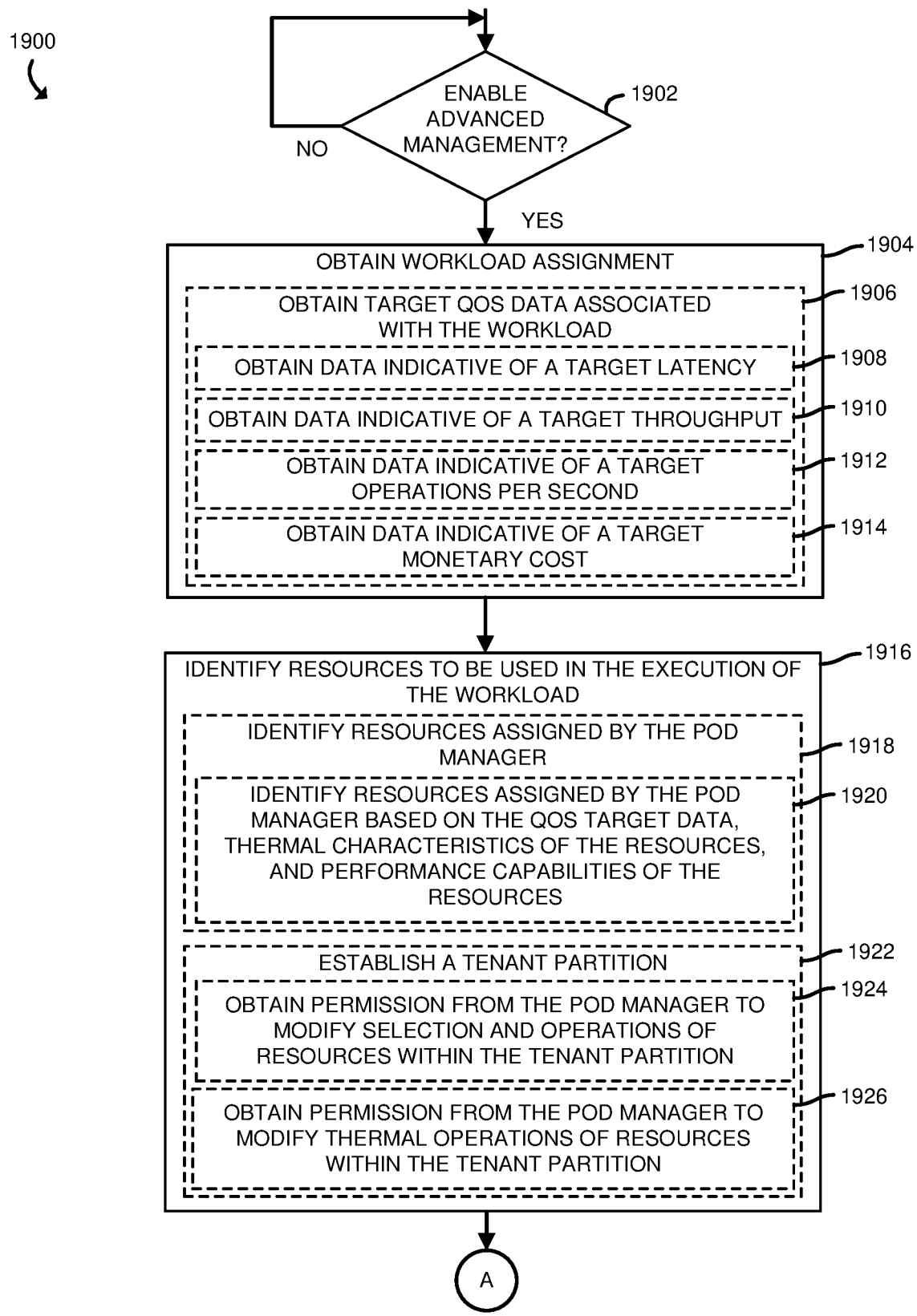
FIGS. 19-22 are simplified block diagrams of at least one embodiment of a method for providing advanced resource management that may be performed by a compute device of the system of FIG. 16.

Referring now to FIG. 19, in operation, a compute device (e.g., a compute sled, such as the compute sled 1620 or pod manager 1608, etc.) may perform a method 1900 for providing advanced resource management. In the illustrative embodiment, the method 1900 begins with block 1902, in which the compute sled (e.g., the compute sled 1620) determines whether to enable advanced resource management. The compute sled 1620 may determine to enable advanced resource management in response to a determination that the compute sled 162 is equipped with the advanced management logic unit 1622, in response to a determination that a configuration setting (e.g., a configuration file) indicates to enable advanced resource management, and/or based on other factors. Regardless, in response to a determination to enable advanced resource management, the method 1900 advances to block 1904, in which the compute sled 1620 obtains a workload assignment (e.g., an application or other set of operations to be performed on behalf of a customer). As indicated in block 1906, in the illustrative embodiment, the compute sled 1620 obtains target QoS data, which may be embodied as any data indicative of one or more objectives to be satisfied in the performance of the workload, and may be defined in a service level agreement between an owner/operator of the system 1600 and the customer (e.g., tenant). For example, as indicated in block 1908, the compute sled 1620 may obtain data indicative of a target latency (e.g., a maximum latency) to be provided in the execution of the workload. Additionally or alternatively, the compute sled 1620 may obtain data indicative of a target throughput, as indicated in block 1910, a target number of operations per second, as indicated in block 1912, and/or a target monetary cost to be incurred in executing the workload, as indicated in block 1914. In other embodiments, additional or alternative targets may be indicated in the target QoS data.

Subsequently, and as indicated in block 1916, the compute sled 1620 identifies resource(s) to be used in the execution of the workload. In doing so, and as indicated in block 1918, the compute sled 1620 may identify resources assigned by the pod manager 1608. As indicated in block 1920, the compute sled 1620 may identify resources assigned by the pod manager 1608 based on the QoS target data, thermal characteristics of the resources (e.g., maximum operating temperature), and performance capabilities of the resources (e.g., latency, operations per second, or other measures of performance at different power consumption levels). In some embodiments, and as indicated in block 1922, the compute sled 1620 may establish a tenant partition (e.g., the tenant partition 1680). In doing so, the compute sled 1620 may obtain permission from the pod manager 1608 to modify the selection and operations of the resources within the tenant partition, as indicated in block 1924. Relatedly, and as indicated in block 1926, the compute sled 1620 may obtain permission from the pod manager 1608 to modify thermal operations associated with the resources in the tenant partition (e.g., adjust a power consumption of one or more resources, adjust a fan speed, etc.). Subsequently, the method 1900 advances to block 1928 of FIG. 20, in which the compute sled 1620 executes the assigned workload with the identified resources.

Figure 20:
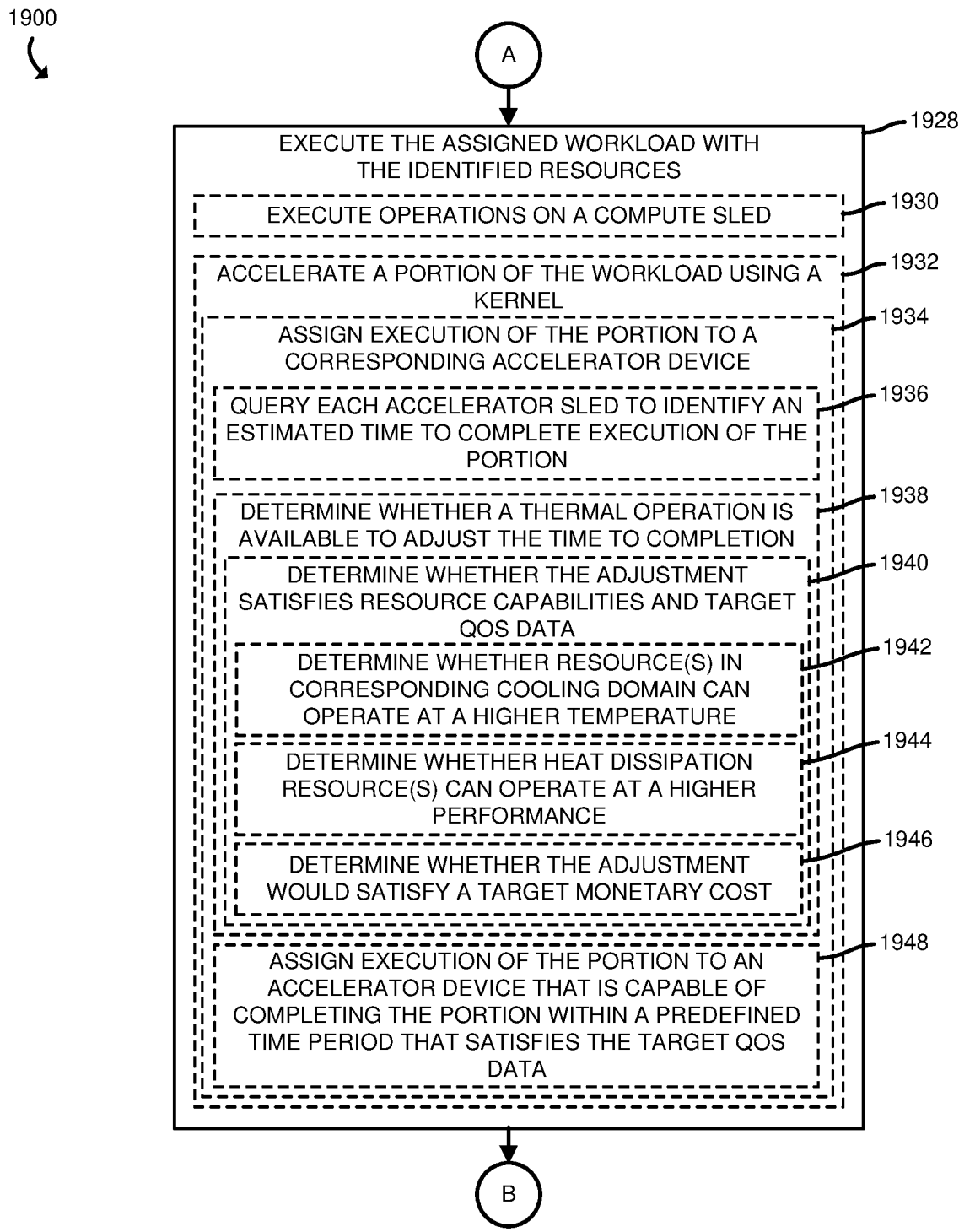

Referring now to FIG. 20, the compute sled 1620 may execute operations associated with the workload (e.g., using the processor(s) 1624), as indicated in block 1930. As indicated in block 1932, the compute sled 1620 may accelerate a portion of the workload using a kernel (e.g., a set of instructions, a bit stream defining a configuration of gates of an FPGA, etc.) usable by an accelerator device (e.g., accelerator devices 1644, 1646). In doing so, and as indicated in block 1934, the compute sled 1620 may assign execution of the portion of the workload to a corresponding accelerator device (e.g., one or more of the accelerator devices 1644, 1646). In some embodiments, the compute sled 1620 may query each accelerator sled (e.g., the accelerator sled 1640 and/or other accelerator sleds, such as the accelerator sled 1652) to identify an estimated time to complete execution of the portion of the workload (e.g., if the portion of the workload were to be performed on one or more of the accelerator devices on the corresponding accelerator sled), as indicated in block 1936. The queried accelerator sleds may determine a present number of kernels in the queue(s) 1648, and, in some embodiments, data indicative of an amount of time required to complete execution of each kernel already present in the kernel queue(s) 1648, to estimate the time to completion for the kernel associated with the request from the compute sled 1620. In block 1938, the compute sled 1620 may determine whether a thermal operation (e.g., increasing power consumption of one or more accelerator devices 1644, 1646) is available to adjust a time to completion (e.g., the time to completion from block 1936). In doing so, the compute sled 1620 may determine whether the adjustment satisfies resource capabilities (e.g., by querying the thermal management logic unit 1702 on the accelerator sled 1640) and target QoS data, as indicated in block 1940. For example, and as indicated in block 1942, the compute sled 1620 may determine whether resource(s) in corresponding cooling domains (e.g., the cooling domains 1710, 1730 on the accelerator sled 1640) can operate at a higher temperature, as indicated in block 1942. Relatedly, the compute sled 1620 may determine whether heat dissipation resources (e.g., the heat dissipation resources 1720, 1740, 1750) can operate at a higher performance (e.g., to offset any additional heat produced by operating an accelerator device 1644, 1646 at higher power consumption) as indicated in block 1944. Further, the compute sled 1620 may determine whether the adjustment would satisfy a target monetary cost (e.g., whether increasing the power consumption of the accelerator device(s) and the heat dissipation resources would exceed a monetary budget defined in the QoS data (e.g., in an SLA)), as indicated in block 1946. In block 1948, the compute sled 1620 may assign execution of the portion of the workload to one or more accelerator device(s) (e.g., one or more of the accelerator devices 1644, 1646) capable of completing the portion within a predefined time period that satisfies the target QoS data.

Figure 21:
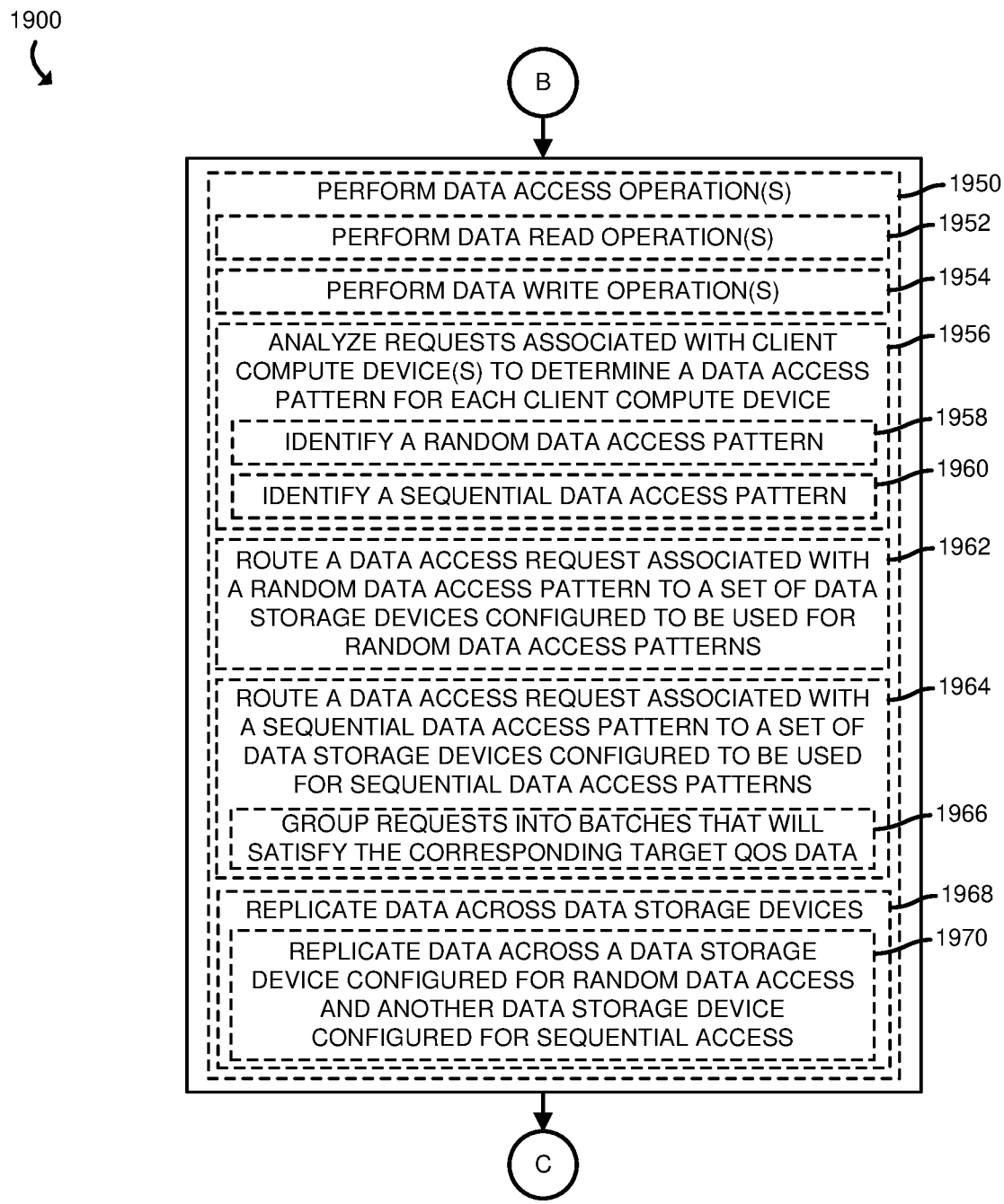

Referring now to FIG. 21, the compute sled 1620 may perform data access operations in the execution of the workload, as indicated in block 1950. The compute sled 1620 may perform the data access operations described below by issuing corresponding requests to the data storage sled(s) (e.g., the data storage sled 1660), fabric switch(es) 1612, and/or other devices). In performing data access operations, the compute sled 1620 may perform data read operation(s) as indicated in block 1952 and/or data write operation(s), as indicated in block 1954. In some embodiments, the compute sled 1620 may analyze requests (e.g., data access requests) associated with client compute devices (e.g. the client compute devices 1602, 1604) to determine a data access pattern associated with each client compute device, as indicated in block 1956. In doing so, the compute sled 1620 may identify a random data access pattern (e.g., requesting non-sequential sets of data, such as in database queries) as indicated in block 1958 and/or may identify sequential data access patterns (e.g., requesting sequential sections of video, audio, or other media in a content delivery network) as indicated in block 1960. In block 1962, the compute sled 1620 may route data access requests associated with a random data access pattern to a set of data storage devices configured to be used for random data access patterns. Similarly, the compute sled 1620 may route data access requests associated with a sequential data access pattern to a set of data storage devices configured to be used for sequential data access patterns, as indicated in block 1964. In doing so, and as indicated in block 1966, the compute sled 1620 may group requests into batches that will satisfy the corresponding target QoS data. For example, the compute sled 1620 may accumulate requests for sequential data sets into a batch, then send the batch of requests to one or more data storage devices in a burst (e.g., to minimize a total seek time), but without holding the requests for so long that a target latency is exceeded. In some embodiments, the compute sled 1620 may replicate data across data storage devices, as indicated in block 1968. In doing so, the compute sled 1620 may replicate data across a data storage device configured for random data access and another data storage device configured for sequential data access, as indicated in block 1970.

Figure 22:
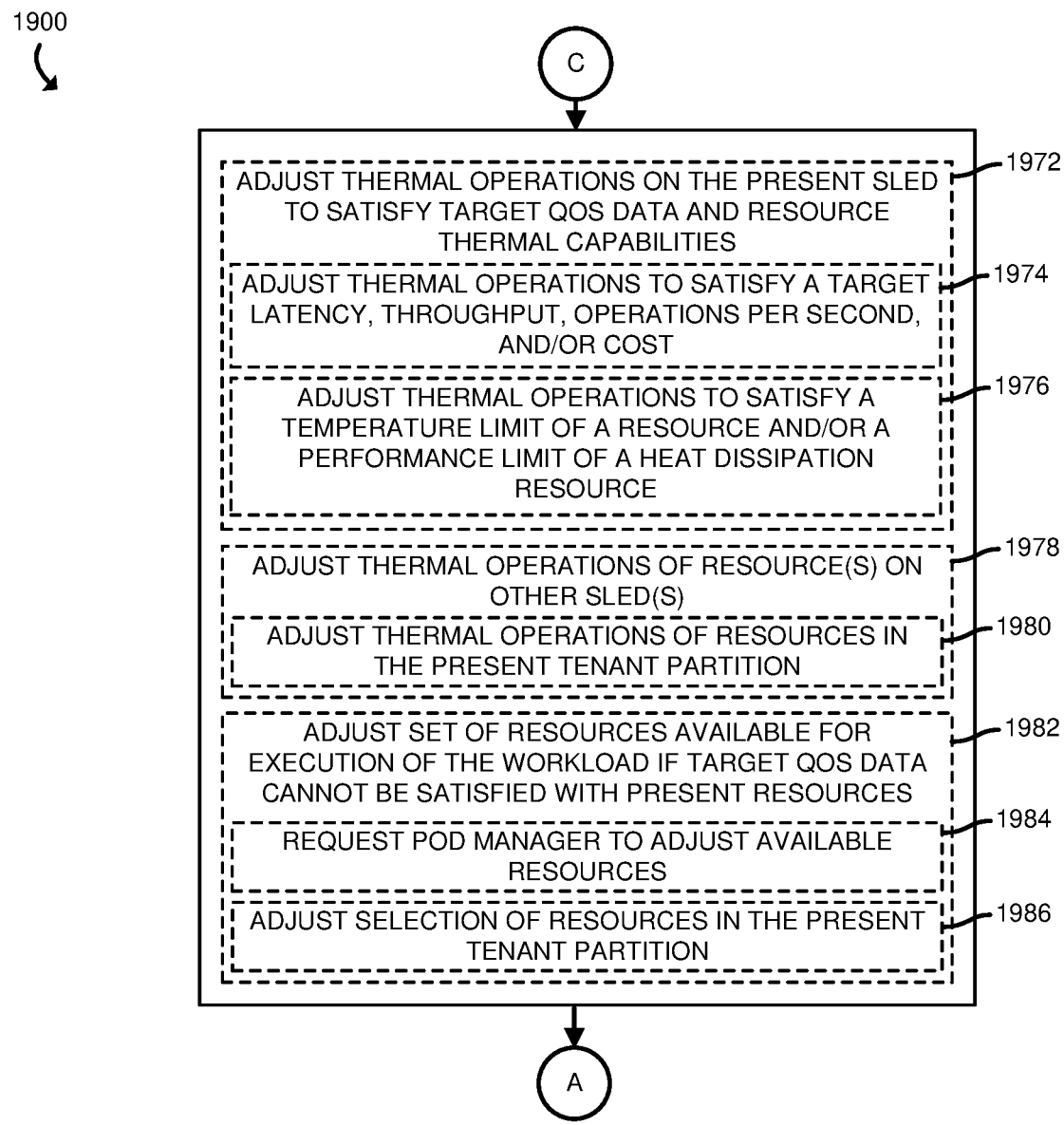

Referring now to FIG. 22, the compute sled 1620 may adjust one or more thermal operations on the present sled (e.g., on the compute sled 1620) to satisfy target QoS data and resource thermal capabilities, as indicated in block 1972. For example, as indicated in block 1974, the compute sled 1620 may adjust thermal operations on the compute sled 1620 to satisfy a target latency, a target throughput, a target number of operations per second, and/or a target monetary cost (e.g., reducing power consumption to reduce the monetary cost for executing the workload). As indicated in block 1976, the compute sled 1620 may adjust thermal operations on the present sled 1620 to satisfy a temperature limit of a resource (e.g., to operate below a maximum operating temperature) and/or a performance limit of a heat dissipation resource (e.g., a peak fan speed). Similarly, the compute sled 1620 may adjust thermal operations of resource(s) on other sleds (e.g., sleds having resources that are executing portion(s) of the assigned workload), as indicated in block 1978. In some embodiments, the compute sled 1620 may adjust thermal operations of resources in the present tenant partition (e.g., the tenant partition 1680, established in block 1922 of FIG. 19), as indicated in block 1980. For example, the compute sled 1620 may cause the thermal operations determined in block 1938 of FIG. 20 to be executed (e.g., by issuing corresponding request(s) for the operations to be performed). In some embodiments, the compute sled 1620 may adjust the set of resources available for execution of the assigned workload if the target QoS data cannot be satisfied with the present resources (e.g., including any thermal adjustments to increase the throughput, operations per second, etc. of the resources), as indicated in block 1982. In doing so, the compute sled 1620 may request the pod manager 1608 to adjust the set of available resources (e.g., allocate more resources for the execution of the workload), as indicated in block 1984. Alternatively, the compute sled 1620 may adjust the selection of resources (e.g., increase the number of resources) in the present tenant partition (e.g., using the permission granted by the pod manager 1608 in block 1924) to enable the workload to be performed in satisfaction of the target QoS data. Subsequently, the method 1900 loops back to block 1928 of FIG. 20, in which the compute sled 1620 continues execution of the assigned workload using the available resources. While the operations of the method 1900 are described in a particular order above, it should be understood that some of the operations may be performed in a different order and/or concurrently (e.g., adjusting thermal operations while also identifying patterns in data access requests). Further, while the method 1900 is described as being performed by the compute sled 1620, it should be understood that the method 1900 may be additionally or alternatively performed in whole or in part by other compute devices (e.g., sleds) in the system 1600.

EXAMPLES

Illustrative examples of the technologies disclosed herein are provided below. An embodiment of the technologies may include any one or more, and any combination of, the examples described below.

Example 1 includes a compute device comprising circuitry to obtain a workload to be executed by a set of resources in a disaggregated system; query a sled in the disaggregated system to identify an estimated time to complete execution of a portion of the workload to be accelerated using a kernel; and assign, in response to a determination that the estimated time to complete execution of the portion of the workload satisfies a target quality of service associated with the workload, the portion of the workload to the sled for acceleration.

Example 2 includes the subject matter of Example 1, and wherein the circuitry is further to determine whether a thermal operation is available to adjust the estimated time to complete execution of the portion of the workload; and cause, in response to a determination that the thermal operation is available to adjust the estimated time, the thermal operation to be executed on the sled.

Example 3 includes the subject matter of any of Examples 1 and 2, and wherein to determine whether a thermal operation is available to adjust the estimated time comprises to determine whether the thermal operation will satisfy capabilities of one or more resources on the sled and the target quality of service.

Example 4 includes the subject matter of any of Examples 1-3, and wherein to determine whether the thermal operation will satisfy the capabilities of the one or more resources on the sled comprises to determine whether resources in a corresponding cooling domain on the sled are capable of operating at an increased temperature.

Example 5 includes the subject matter of any of Examples 1-4, and wherein to determine whether the thermal operation will satisfy the capabilities of the one or more resources on the sled comprises to determine whether one or more heat dissipation resources on the sled are capable of operating at an increased performance.

Example 6 includes the subject matter of any of Examples 1-5, and wherein to determine whether the thermal operation will satisfy the target quality of service comprises to determine whether the thermal operation will satisfy a target monetary cost.

Example 7 includes the subject matter of any of Examples 1-6, and wherein the circuitry is further to establish a tenant partition comprising a subset of the resources in the disaggregated system.

Example 8 includes the subject matter of any of Examples 1-7, and wherein the circuitry is further to obtain, from a pod manager, permission to modify the subset of resources in the tenant partition.

Example 9 includes the subject matter of any of Examples 1-8, and wherein the circuitry is further to obtain, from a pod manager, permission to modify thermal operations of the subset of resources in the tenant partition.

Example 10 includes the subject matter of any of Examples 1-9, and wherein the circuitry is further to utilize the resources in the disaggregated system to perform data access operations.

Example 11 includes the subject matter of any of Examples 1-10, and wherein the circuitry is further to analyze requests associated with client compute devices to determine a data access pattern for each client compute device.

Example 12 includes the subject matter of any of Examples 1-11, and wherein the circuitry is further to identify at least one of a random data access pattern or a sequential data access pattern.

Example 13 includes the subject matter of any of Examples 1-12, and wherein the circuitry is further to route a data access request associated with a random data access pattern to a set of data storage devices configured to be used for random data access patterns.

Example 14 includes the subject matter of any of Examples 1-13, and wherein the circuitry is further to route a data access request associated with a sequential data access pattern to a set of data storage devices configured to be used for sequential data access patterns.

Example 15 includes the subject matter of any of Examples 1-14, and wherein the circuitry is further to group requests associated with the sequential data access pattern into one or more batches.

Example 16 includes the subject matter of any of Examples 1-15, and wherein the circuitry is further to group requests as a function of a priority assigned to one or more workloads associated with the requests.

Example 17 includes the subject matter of any of Examples 1-16, and wherein the circuitry is further to replicate data across a data storage device configured for random data access patterns and a data storage device configured for sequential data storage access patterns.

Example 18 includes one or more machine-readable storage media comprising a plurality of instructions stored thereon that, in response to being executed, cause a compute device to obtain a workload to be executed by a set of resources in a disaggregated system; query a sled in the disaggregated system to identify an estimated time to complete execution of a portion of the workload to be accelerated using a kernel; and assign, in response to a determination that the estimated time to complete execution of the portion of the workload satisfies a target quality of service associated with the workload, the portion of the workload to the sled for acceleration.

Example 19 includes the subject matter of Example 18, and wherein the instructions further cause the compute device to determine whether a thermal operation is available to adjust the estimated time to complete execution of the portion of the workload; and cause, in response to a determination that the thermal operation is available to adjust the estimated time, the thermal operation to be executed on the sled.

Example 20 includes a method comprising obtaining, by a compute device, a workload to be executed by a set of resources in a disaggregated system; querying, by the compute device, a sled in the disaggregated system to identify an estimated time to complete execution of a portion of the workload to be accelerated using a kernel; and assigning, by the compute device and in response to a determination that the estimated time to complete execution of the portion of the workload satisfies a target quality of service associated with the workload, the portion of the workload to the sled for acceleration.

The invention claimed is:
1. A compute device comprising:
an interface to couple the compute device with a plurality of sleds in a disaggregated system; and
circuitry to:
obtain a workload to be executed by a set of resources in the disaggregated system;
query, through the interface, a sled from among the plurality of sleds to identify an estimated time to complete execution of a portion of the workload to be accelerated by a field programmable gate array (FPGA) executing a kernel; and assign, in response to a determination that the estimated time to complete execution of the portion of the workload satisfies a target quality of service associated with the workload, the portion of the workload to the sled for acceleration.

2. The compute device of claim 1, wherein the circuitry is further to:

determine whether a thermal operation is available to adjust the estimated time to complete execution of the portion of the workload; and cause, in response to a determination that the thermal operation is available to adjust the estimated time, the thermal operation to be executed on the sled.

3. The compute device of claim 2, wherein to determine whether a thermal operation is available to adjust the estimated time comprises to determine whether the thermal operation will satisfy capabilities of one or more resources on the sled and the target quality of service.

4. The compute device of claim 3, wherein to determine whether the thermal operation will satisfy the capabilities of the one or more resources on the sled comprises to determine whether resources in a corresponding cooling domain on the sled are capable of operating at an increased temperature.

5. The compute device of claim 3, wherein to determine whether the thermal operation will satisfy the capabilities of the one or more resources on the sled comprises to determine whether one or more heat dissipation resources on the sled are capable of allowing the sled to operate at an increased performance.

6. The compute device of claim 3, wherein to determine whether the thermal operation will satisfy the target quality of service comprises to determine whether the thermal operation will satisfy a target monetary cost.

7. The compute device of claim 1, wherein the circuitry is further to establish a tenant partition comprising a subset of the resources in the disaggregated system.

8. The compute device of claim 7, wherein the circuitry is further to obtain, from a pod manager, permission to modify the subset of resources in the tenant partition.

9. The compute device of claim 7, wherein the circuitry is further to obtain, from a pod manager, permission to modify thermal operations of the subset of resources in the tenant partition.

10. The compute device of claim 1, comprising the circuitry to utilize the set of resources in the disaggregated system to perform data access operations, wherein the plurality of sleds include a set of data storage devices.

11. The compute device of claim 10, wherein the circuitry is further to analyze requests associated with client compute devices to determine a data access pattern for each client compute device.

12. The compute device of claim 11, wherein the circuitry is further to identify at least one of a random data access pattern or a sequential data access pattern.

13. The compute device of claim 11, wherein the circuitry is further to route a data access request associated with a random data access pattern to the set of data storage devices configured to be used for random data access patterns.

14. The compute device of claim 11, wherein the circuitry is further to route a data access request associated with a sequential data access pattern to the set of data storage devices configured to be used for sequential data access patterns.

15. The compute device of claim 14, wherein the circuitry is further to group requests associated with the sequential data access pattern into one or more batches.

16. The compute device of claim 14, wherein the circuitry is further to group requests as a function of a priority assigned to one or more workloads associated with the requests.

17. The compute device of claim 11, wherein the circuitry is further to replicate data across a data storage device configured for random data access patterns and a data storage device configured for sequential data storage access patterns.

18. One or more non-transitory machine-readable storage media comprising a plurality of instructions stored thereon that, in response to being executed, cause a compute device to:

obtain a workload to be executed by a set of resources in a disaggregated system;

query a sled from among a plurality of sleds in the disaggregated system to identify an estimated time to complete execution of a portion of the workload to be accelerated by a field programmable gate array (FPGA) executing a kernel; and assign, in response to a determination that the estimated time to complete execution of the portion of the workload satisfies a target quality of service associated with the workload, the portion of the workload to the sled for acceleration.

19. The one or more non-transitory machine-readable storage media of claim 18, wherein the instructions further cause the compute device to:

determine whether a thermal operation is available to adjust the estimated time to complete execution of the portion of the workload; and cause, in response to a determination that the thermal operation is available to adjust the estimated time, the thermal operation to be executed on the sled.

20. A method comprising:

obtaining, by a compute device, a workload to be executed by a set of resources in a disaggregated system;

querying, by the compute device, a sled from among a plurality of sleds in the disaggregated system to identify an estimated time to complete execution of a portion of the workload to be accelerated by a field programmable gate array (FPGA) executing a kernel; and assigning, by the compute device and in response to a determination that the estimated time to complete execution of the portion of the workload satisfies a target quality of service associated with the workload, the portion of the workload to the sled for acceleration.

* * * * *